United States Patent
Kaneda et al.

(10) Patent No.: US 8,670,922 B2
(45) Date of Patent: Mar. 11, 2014

(54) GUIDING ROUTE GENERATION DEVICE AND GUIDING ROUTE GENERATION METHOD

(75) Inventors: Masaki Kaneda, Iwaki (JP); Masahiro Ueno, Suginami-ku (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1497 days.

(21) Appl. No.: 11/795,477

(22) PCT Filed: Jan. 18, 2006

(86) PCT No.: PCT/JP2006/301088
§ 371 (c)(1),
(2), (4) Date: Jul. 18, 2007

(87) PCT Pub. No.: WO2006/078049
PCT Pub. Date: Jul. 27, 2006

(65) Prior Publication Data
US 2008/0154489 A1    Jun. 26, 2008

(30) Foreign Application Priority Data

Jan. 19, 2005  (JP) ................................ 2005-011527
Jan. 19, 2005  (JP) ................................ 2005-011535

(51) Int. Cl.
*G01C 21/26*      (2006.01)

(52) U.S. Cl.
USPC ........... 701/201; 701/400; 701/410; 701/437; 701/467; 701/468; 340/995.1; 340/995.14; 340/995.16; 340/995.19; 340/995.2

(58) Field of Classification Search
None
See application file for complete search history.

(56) References Cited

U.S. PATENT DOCUMENTS

| | | | | |
|---|---|---|---|---|
| 4,888,699 A | * | 12/1989 | Knoll et al. | ................... 701/209 |
| 5,268,844 A | * | 12/1993 | Carver et al. | ................. 701/200 |
| 5,406,491 A | * | 4/1995 | Lima | ............................. 701/210 |

(Continued)

FOREIGN PATENT DOCUMENTS

| | | |
|---|---|---|
| EP | 1 369 667 | 12/2003 |
| JP | 09-280882 | 10/1997 |

(Continued)

OTHER PUBLICATIONS

International Preliminary Examination Report (Application No. PCT/JP2005/301088) dated Aug. 2, 2007.

(Continued)

*Primary Examiner* — Jonathan M Dager
(74) *Attorney, Agent, or Firm* — Eric J. Robinson; Robinson Intellectual Property Law Office, P.C.

(57) ABSTRACT

When a user specifies a road that he/she wants to pass through, a guiding route generation device generates a guiding route that passes through the specified road up to a destination. A guiding route (37) generated based on waypoints specified is stored in a storage device (15) of the guiding route generation device. A display device (11) displays the guiding route (37) along with roads in the periphery. The guiding route generation device specifies a certain road as the specified pass-through road from among the roads displayed along with the guiding route (37), and further, finds and determines whether there are crossings and the number of the crossings between the specified pass-through road and the guiding route (37).

20 Claims, 16 Drawing Sheets

(56) References Cited

U.S. PATENT DOCUMENTS

| | | | |
|---|---|---|---|
| 5,646,856 A * | 7/1997 | Kaesser | 701/207 |
| 5,906,654 A * | 5/1999 | Sato | 701/210 |
| 6,349,257 B1 * | 2/2002 | Liu et al. | 701/200 |
| 6,418,374 B2 * | 7/2002 | Sakamoto et al. | 701/410 |
| 6,653,948 B1 * | 11/2003 | Kunimatsu et al. | 340/995.19 |
| 6,721,655 B1 | 4/2004 | Utsumi | |
| 6,909,380 B2 * | 6/2005 | Brooke | 340/906 |
| 7,065,447 B2 * | 6/2006 | Shimizu et al. | 701/414 |
| 7,564,375 B2 * | 7/2009 | Brinton et al. | 340/988 |
| 8,265,867 B2 * | 9/2012 | Arita et al. | 701/410 |
| 8,306,733 B2 * | 11/2012 | Shikimachi | 701/408 |
| 8,483,950 B2 * | 7/2013 | Okude et al. | 701/411 |
| 2001/0029425 A1 * | 10/2001 | Myr | 701/200 |
| 2003/0078727 A1 | 4/2003 | Komatsu | |
| 2003/0163333 A1 * | 8/2003 | Podgurny et al. | 705/1 |
| 2004/0215390 A1 * | 10/2004 | Nomura | 701/209 |
| 2004/0249568 A1 * | 12/2004 | Endo et al. | 701/209 |
| 2005/0027436 A1 * | 2/2005 | Yoshikawa et al. | 701/117 |
| 2005/0033511 A1 * | 2/2005 | Pechatnikov et al. | 701/210 |
| 2005/0209770 A1 * | 9/2005 | O'Neill et al. | 701/117 |
| 2005/0278115 A1 * | 12/2005 | Okada | 701/212 |
| 2005/0288046 A1 * | 12/2005 | Zhao et al. | 455/466 |
| 2006/0100779 A1 * | 5/2006 | Vergin | 701/211 |
| 2006/0224316 A1 * | 10/2006 | Ishida et al. | 701/211 |
| 2006/0276959 A1 * | 12/2006 | Matsuoka et al. | 701/200 |
| 2007/0005241 A1 * | 1/2007 | Sumizawa et al. | 701/211 |
| 2007/0106466 A1 * | 5/2007 | Noguchi | 701/209 |
| 2008/0300781 A1 * | 12/2008 | Sakai | 701/202 |
| 2011/0029230 A1 * | 2/2011 | Kimura | 701/201 |

FOREIGN PATENT DOCUMENTS

| | | |
|---|---|---|
| JP | 10-185598 | 7/1998 |
| JP | 2000-111354 | 4/2000 |
| JP | 2003-121186 | 4/2003 |
| WO | WO 02/073133 | 9/2002 |

OTHER PUBLICATIONS

International Search Report for PCT/JP2006/301088.
Supplementary European Search Report (Application No. 06701414.2) dated Aug. 21, 2012.

* cited by examiner

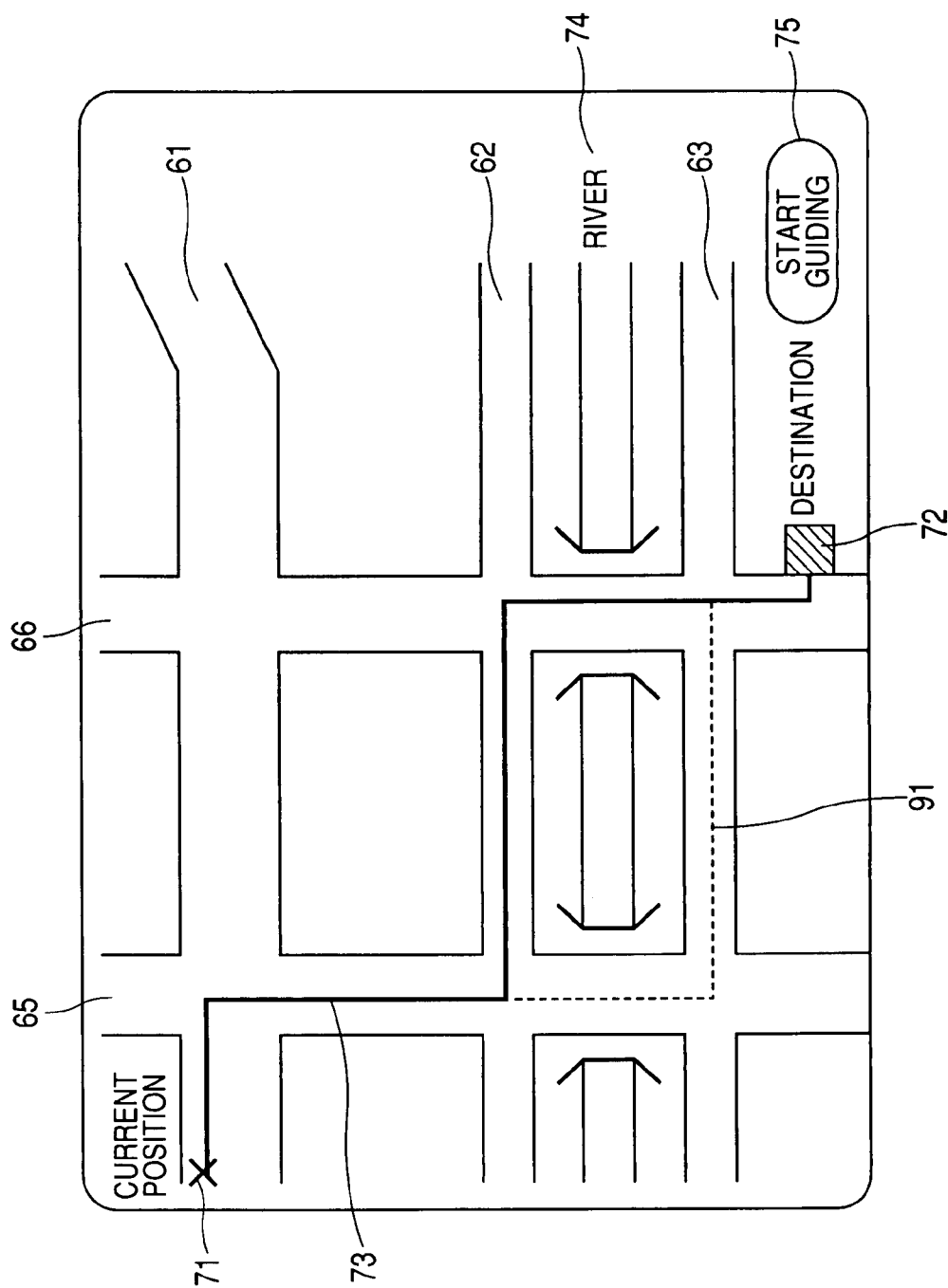

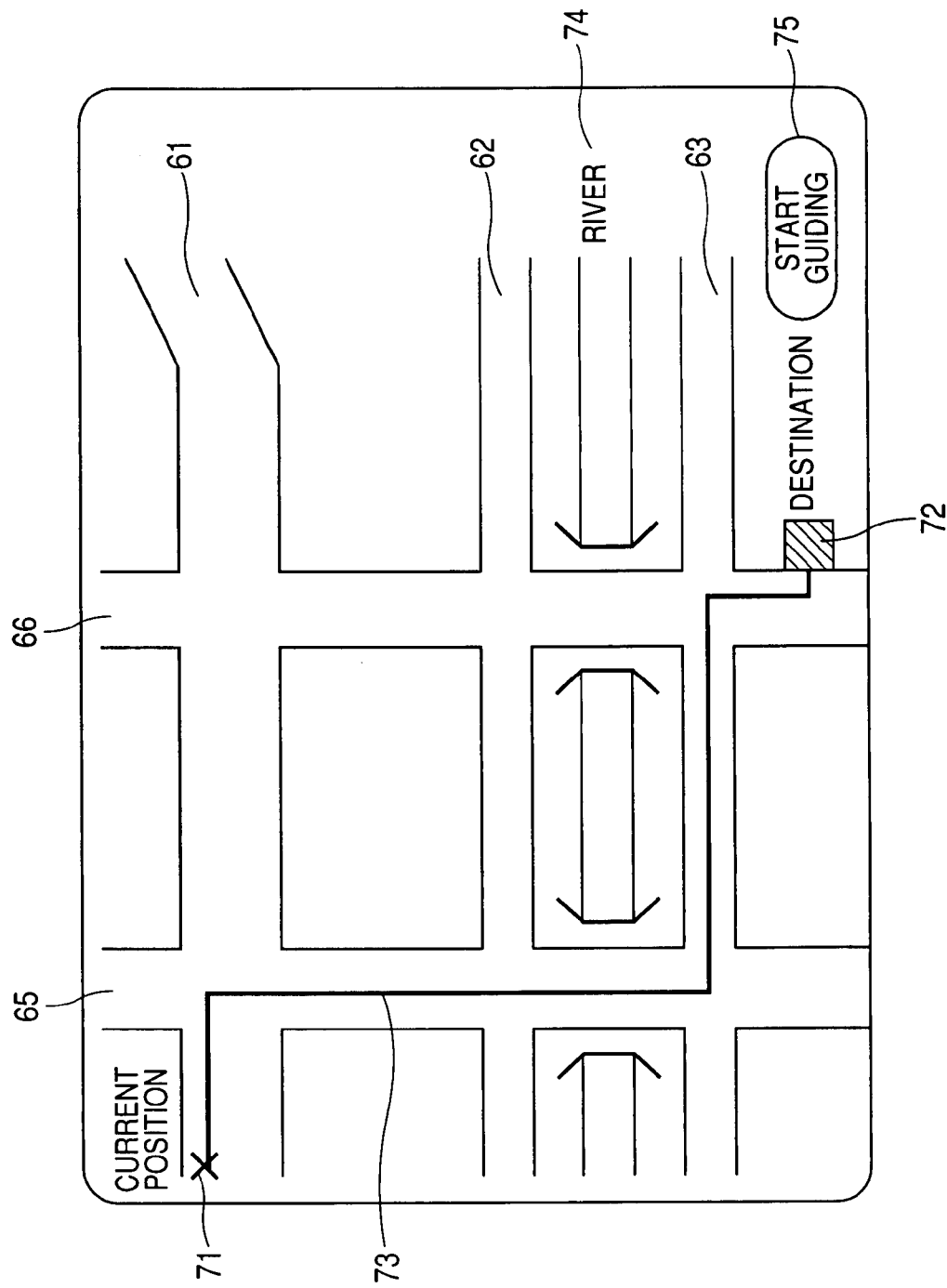

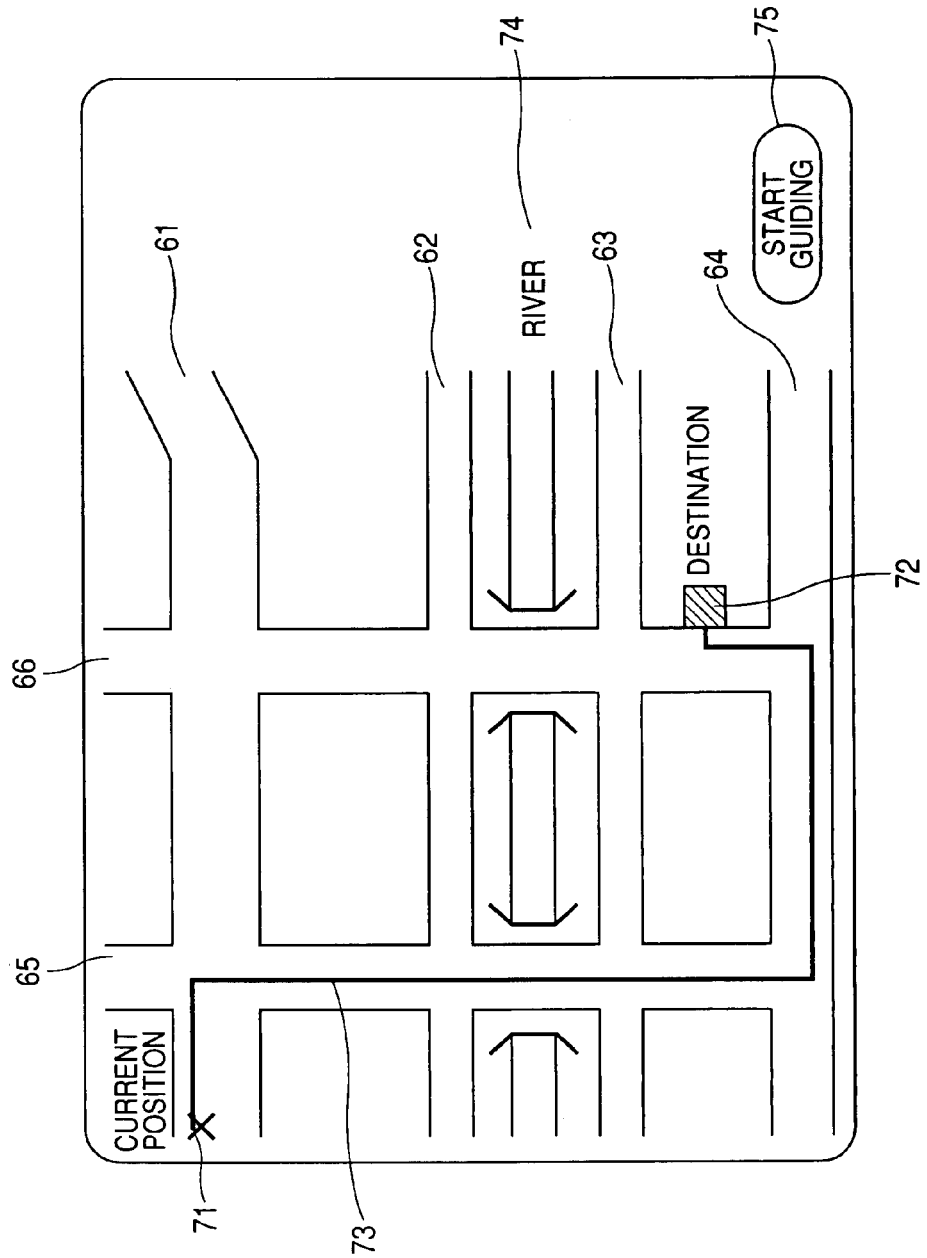

GUIDING ROUTE GENERATION DEVICE AND GUIDING ROUTE GENERATION METHOD

TECHNICAL FIELD

The present invention relates to a guiding route generation device and a guiding route generation method.

BACKGROUND ART

Japanese Patent Application Laid-Open No. 2001-108465 discloses a guiding route searching system. The guiding route searching system sets a destination by adjusting a coordinate position and a scaling magnifier and the like so that the destination is displayed on a map. Then, the presence of the route image from the current, position to the destination is checked and, if it is present, the route image is input. The criteria are to select the road nearby the traced route image as a candidate so that the passage cost for roads nearby the route image is reduced. The roads nearby the route image are combined together and the combination with the lowest cost from the current position to the destination is searched as the guiding route.

As Japanese Patent Application Laid-Open No. 2001-108465 discloses, some devices for searching a guiding route can specify a route, which a user wants to pass through on a map. If a predetermined route is specified on a touch panel when a check screen that displays a destination and the like appears, a desired route can be specified.

In the case of Japanese Patent Application Laid-Open No. 2001-108465, however, after a desired route is specified, a passage cost for the roads nearby the route image is lowered and the route is searched. When the route from the current position to the destination is searched after the route image is specified as such and if the specified desired route is at a distant from a route which is searched by a device for searching a guiding route with no specification of such a passing route, a route that does not pass through a user-specified route may be generated as a guiding route. For example, a route that passes between the user-specified route and the guiding route that is generated when a passing route is not specified may be generated as a guiding route. If such a guiding route is generated, it is impossible to guide a user to the destination through a route, which the user wants to pass through.

Then, it can be considered to generate routes from the current position to the destination and then let a user to specify a route that the user wants to pass through on a screen for checking the generated routes. In such a case, a guiding route that takes a user-specified route can be generated as a partial section of the generated guiding routes is replaced for a user-specified pass-through road. The user can be guided to the destination through a guiding route that the user wants to pass through.

If a partial guiding route is generated and then replaced for a user-specified pass-through route, however, the replaced guiding route becomes inappropriate as a guiding route from the current position to the destination.

Some roads are available for traffic in both directions, the others are available for traffic in only one direction. A user moves his or her finger along the road displayed on the check screen for a guiding route to specify the passing route. Sometimes, the user-specified road as a passing route on the check screen for a guiding route may unavailable for traffic according to the passing direction for the guiding route from the current position to the destination.

Some roads are prohibited for right turn. A user moves his or her finger along the road displayed on the check screen for a guiding route. Sometimes, the user-specified road as a passing route on the check screen for a guiding route may unavailable for traffic according to the passing direction for the guiding route from the current position to the destination.

If a part of the guiding route is generated and then replaced for another one based on passage specification by a user, the user needs to specify a road that he or she wants to pass through to cross the generated guiding route in specifying the road. There is also a problem in that the user needs to specify the route including the specifying road to cross the guiding route also for the roads other than the road that the user wants to pass through.

DISCLOSURE OF THE INVENTION

The present invention is adapted in view of the abovementioned problems and intends to provide a guiding route generating device and a guiding route generating method which can generate a guiding route to reach a destination through a road that is specified by a user to pass through and available for traffic.

A guiding route generating device according to the present invention includes storage means for storing a guiding route generated based on specification of a position as a route used in guiding a route; display means for displaying the guiding route stored in the storage means with roads in the periphery of the guiding route; specified route determining means for determining whether the road based on passage specification by a user among the roads displayed with the guiding route is available as a part of a route from a starting point to an ending point of the guiding route or not; generating means for generating an alternative route for a place unavailable of the road if the road specified to pass through by the specified route determining means is determined as unavailable; and updating means for updating a part or the entire of the guiding route stored in the storage means with the route which combines the road determined as available by the specified route determining means and the road of the alternative route generated by the generating means.

The guiding route generating device according to the present invention includes second storage means for storing the road determined as unavailable by the specified route determining means, wherein the display means displays the road stored in the second storage means with the guiding route that is updated by the updating means and stored in the storage means, in addition to the arrangement of the above mentioned invention.

The guiding route generating device according to the present invention includes detecting means arranged over the display means for detecting an operation position against the display means; and specifying means for specifying a road displayed in the periphery of the operation position as a road based on passage specification by the user in accordance with the operation position detected by the detecting means, in addition to the arrangement of each of the abovementioned invention.

The guiding route generating device according to the present invention includes link storage means for storing a plurality of links corresponding to a road wherein the specified route determining means determines that the road based on the passage specification is unavailable if a link in the direction from a starting point to an ending point of the guiding route stored in the storage means is not stored in the link storage means as a link for the road based on the passage specification, in addition to the arrangement of each of the abovementioned invention.

The guiding route generating device according to the present invention includes regulation information storage means for storing traffic regulation information relating to a road wherein the specified route determining means determines that the road based on the passage specification is unavailable if the guiding route for the road based on the passage specification is regulated for traffic in the direction from a starting point to an ending point based on the traffic regulation information, in addition to the arrangement of each of the abovementioned invention.

The guiding route generating device according to the present invention is such that the generating means generates a route for a section that is determined as unavailable by the specified route determining means with both ends being a starting point and an ending point and makes the generated route as an alternative route, in addition to the arrangement of each of the abovementioned invention.

The guiding route generating device according to the present invention is such that the updating means updates the guiding route stored in the storage means by updating a section between two intersections of the route which combines the road determined as available by the specified route determining means and the road for the alternative route generated by the generating means and the guiding route stored in the storage means to a route based on the combined route, in addition to the arrangement of each of the abovementioned invention.

The guiding route generating device according to the present invention includes regulation information storage means for storing traffic regulation information relating to roads; and intersection determining means for determining that a route is unavailable if the regulation information storage means stores information for regulating traffic in the direction from a starting point to an ending point of the guiding route for two intersections of the route updated by the updating means, in addition to the arrangement of each of the abovementioned invention.

The guiding route generating device according to the present invention includes second generating means for generating an alternative route which passes over or near the intersection that is determined as unavailable for traffic if the route is determined as unavailable for traffic by the intersection determining means, and both ends of which are connected to the route updated by the updating means, and additional updating means for updating a part of the guiding route updated by the updating means, in addition to the arrangement of each of the abovementioned invention.

The guiding route generating device according to the present invention is such that the storage means stores the guiding route updated by the updating means and the guiding route generated based on the specification of a position separately; and the guiding route generating device includes warning means for warning if it is determined as unavailable for traffic by the intersection determining means; and specifying means for specifying the guiding route generated based on the specification of a position as a route for guiding after warning is made by the warning means, in addition to the arrangement of each of the abovementioned invention.

Another guiding route generating device according to the present invention includes storage means for storing a guiding route generated based on specification of a position as a route used in guiding a route; display means for displaying the guiding route stored in the storage means with roads in the periphery of the guiding route; user-specified route generating means for generating a user-specified route which is available as a part of the route from a starting point to an ending point of the guiding route based on passage specification by a user for the road displayed with the guiding route; and intersection determining means for determining whether a route which connects the user-specified route generated by the user-specified route generating means with the guiding route stored in the storage means is regulated for traffic in the direction from a starting point to an ending point of the route that connects the routes at their intersection or not.

A guiding route generating method according to the present invention includes a step of displaying a guiding route generated based on specification of a position and stored in a storage means with roads in periphery of the guiding route, a step of determining whether the road based on passage specification by a user among the roads displayed with the guiding route is available as a part of a route from a starting point to an ending point of the guiding route or not, a step of generating an alternative route for a place unavailable if the specified pass-through road is determined as unavailable, and a step of updating the guiding route stored in the storage means with the route which combines the road determined as available and the road for the alternative route.

Another guiding route generating method according to the present invention includes a step of displaying a guiding route generated based on specification of a position and stored in a storage means with roads in periphery of the guiding route, a step of generating a user-specified route which is available as a part of the route from a starting point to an ending point of the guiding route based on passage specification by a user for the road displayed with the guiding route, a step of determining whether a route which connects the generated user-specified route with the guiding route stored in the storage means is regulated for traffic in the direction from a starting point to an ending point of the route that connects the routes at their intersection or not.

A guiding route generating device according to the present invention includes storage means for storing a guiding route generated based on specification of a position as a route used in guiding a route; display means for displaying the guiding route stored in the storage means with roads in the periphery of the guiding route; specified road specifying means for specifying a predetermined road among the roads displayed with the guiding routes as a specified pass-through road based on a user's operation; intersection specifying means for specifying the presence and the number of intersections of the specified pass-through road and the guiding route stored in the storage means; user-specified route generating means for generating two routes between the specified pass-through road and the guiding route and generating a user-specified route which is the specified pass-through road extended with the generated two routes, when the intersection specifying means specifies that there is no intersection, and generating a route between the specified pass-through road and the guiding route and generating a user-specified route which is the specified pass-through road extended with the generated route, when the intersection specifying means specifies only one of the intersections; updated guiding route generating means for generating an updated guiding route by connecting the user-specified route with the guiding route stored in the storage means at their intersections.

The guiding route generating device according to the present invention includes regulation information storage means for storing traffic regulation information relating to the road, determining means for determining whether traffic is available for the updated guiding route generated by the updated guiding route generating means at a connecting point where the user-specified route and the guiding route stored in the storage means are connected based on information stored in the regulation information storage means; and warning means for outputting warning when the determining means determines that traffic is unavailable at the connecting point, in addition to the arrangement of each of the abovementioned invention.

The guiding route generating device according to the present invention includes specifying means for specifying the guiding route stored in the storage means to a route for guiding after warning is made by the warning means, in addition to the arrangement of each of the abovementioned invention.

The guiding route generating device according to the present invention includes regulation information storage means for storing traffic regulation information relating to the road, determining means for determining whether traffic is available for the updated guiding route generated by the updated guiding route generating means at a connecting point where the user-specified route and the guiding route stored in the storage means are connected based on information stored in the regulation information storage means; and additional updating means for updating the updated guiding route generated by the updated guiding route generating means when the determining means determines that traffic is unavailable at the connecting point, in addition to the arrangement of each of the abovementioned invention.

The guiding route generating device according to the present invention is such that the specified road specifying means specifies a road which is displayed nearest to a user operating place or a road which is within a predetermined range from the user's operating place or a place nearest to the user operating place and matches better with searching conditions specified in generating the guiding route as the specified pass-through road, in addition to the arrangement of each of the abovementioned invention.

The guiding route generating device according to the present invention is such that the user-specified route generating means generates a route between the specified pass-through road and the guiding route by searching an end of the specified pass-through route which is not crossing the guiding route and a branch point of a road on the guiding route near the end, in addition to the arrangement of each of the abovementioned invention.

The guiding route generating device according to the present invention is such that the additional updating means updates the updated guiding route by searching for a route between branch points of the road before and after the connecting point that is determined as unavailable for traffic on the updated guiding route and replacing the searched route for the route between the branch point of the road before and the branch point of the road after, in addition to the arrangement of each of the abovementioned invention.

A guiding route generating method according to the present invention includes a step of displaying a guiding route generated based on specification of a position and stored in a storage means with roads in the periphery of the guiding route, a step of specifying a predetermined road among the road displayed with the guiding route as a specified pass-through road based on a user operation, a step of specifying the presence and the number of intersections of the specified pass-through road and the guiding route stored in the storage means, a step of generating two routes between the specified pass-through road and the guiding route and generating a user-specified route which is the specified pass-through road extended with the generated two routes, when it is determined as no intersection is present, and generating a route between the specified pass-through road and the guiding route and generating a user-specified route which is the specified pass-through road extended with the generated route, when only one of the intersections is identified, and a step of generating updated guiding route by connecting the user-specified route with the guiding route stored in the storage means at their intersections.

The present invention can generate a guiding route to reach a destination through user-specified pass-through road, which is available for traffic.

BRIEF DESCRIPTION OF THE DRAWING

FIG. 9A is a diagram showing a first example of a check screen for an updated guiding route displayed after the operation in FIG. 8;

FIG. 9B is a diagram showing a second example of a check screen for an updated guiding route displayed during the operation in FIG. 8;

FIG. 9C is a diagram showing a third example of a check screen for an updated guiding route displayed during the operation in FIG. 8;

BEST MODES FOR CARRYING OUT THE INVENTION

The guiding route generating device and the guiding route generating method according to embodiments of the present invention will be described with reference to the drawings. The guiding route generating device will be described as a part of a car navigation system. The guiding route generating method will be described as a part of operations of the car navigation system.

First Embodiment

Figure 1:
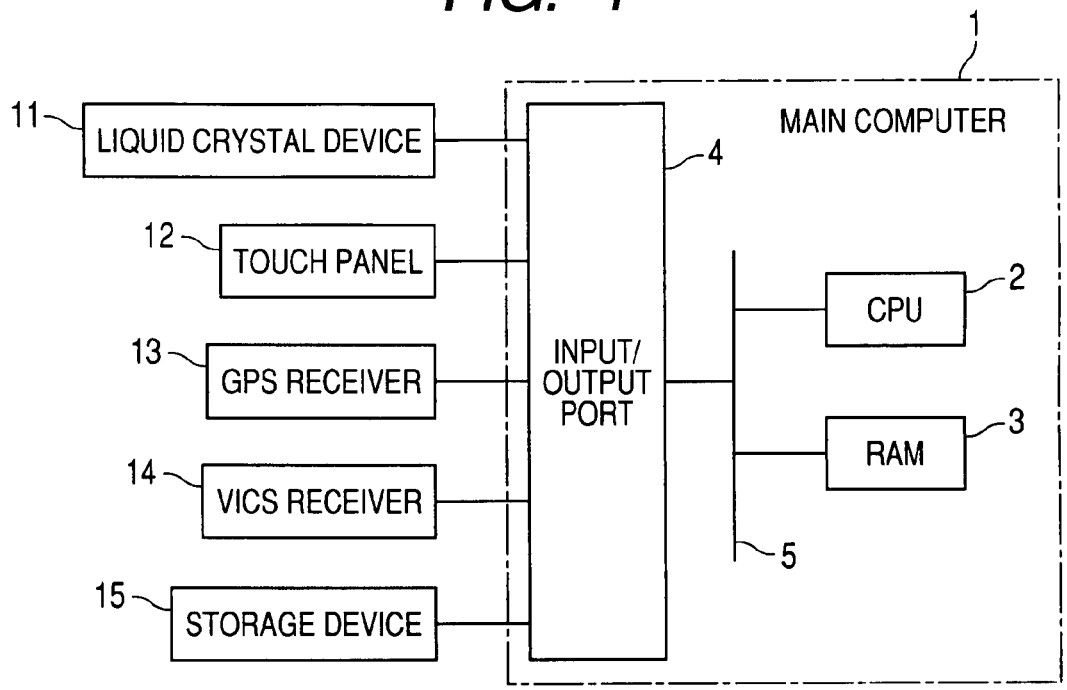
FIG. 1 is a block diagram showing a car navigation system of an embodiment of the present invention.

FIG. 1 is a block diagram showing a car navigation system according to a first embodiment of the present invention. The car navigation system is used with a vehicle such as an automobile. When a destination is selected, the car navigation system generates a guiding route for the vehicle from the current position or the like to the destination or the like. The car navigation system guides the vehicle to move through the generated guiding route.

The car navigation system includes a main computer 1. The main computer 1 includes a CPU (Central Processing Unit) 2 for executing a program, a RAM (Random Access Memory) 3 for storing a program or data executed by the CPU 2, an input/output port 4 to which a peripheral device is connected, and a system bus 5 for connecting those described here.

To the input/output port 4, a liquid crystal device 11 as display means, a touch panel 12, a GPS (Global Positioning System) receiving device 13, a VICS (Vehicle Information and Communication System) receiver 14, a storage device 15 as storage means, second storage means, link storage means and regulation information storage means are connected.

The liquid crystal device 11 has a display section such as a liquid crystal display panel. When display data is input from the input/output port 4 to the liquid crystal device 11, the liquid crystal device 11 displays an image based on the display data on the display section The touch panel 12 has a transparent screen. The transparent screen is arranged over the display section of the liquid crystal device 11. The touch panel 12 detects the position on the transparent screen pressed and outputs position data indicating the detected position to the input/output port 4.

The GPS receiver 13 receives GPS electrical wave from the GPS satellite. The GPS electrical wave has position information and time information on the GPS satellite. When the GPS receiver 13 receives the GPS electrical wave from three or more, for example, GPS satellites, it calculates a relative position of the GPS receiver 13 to the plurality of GPS satellites and generates position information on earth of the GPS receiver 13 based on the relative position. The position information on earth is represented as value of latitude and longitude in the world geodetic system, for example. The GPS receiver 13 outputs the generated position information on the GPS receiver 13 to the input/output port 14.

The VICS receiver 14 receives traffic information sent by an electrical wave beacon, an optical beacon or FM multiple broadcasting. The traffic information includes jam information indicating how much the road is crowded or traffic regulation information indicating the closed period of a road and the like. The VICS receiver 14 outputs the received traffic information to the input/output port 4.

Figure 2:
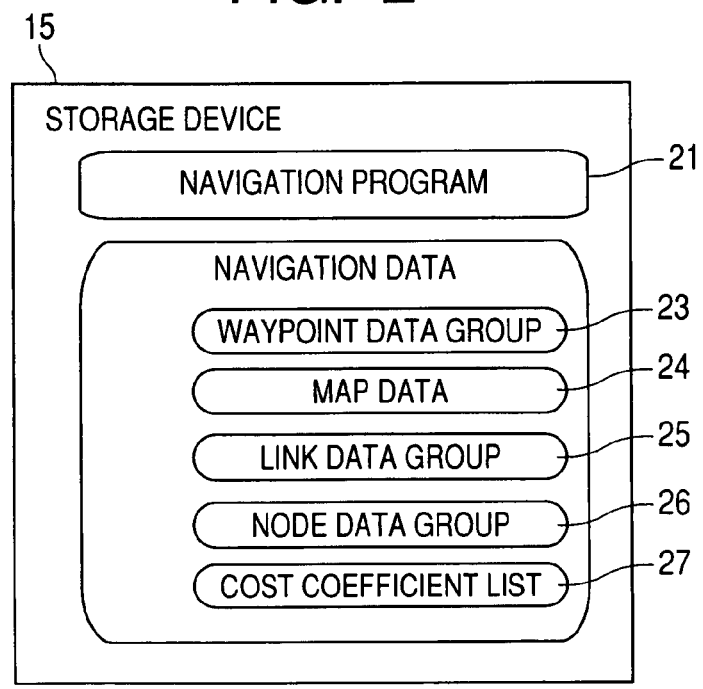
FIG. 2 is a schematic diagram showing the contents stored in a storage device in FIG. 1.

The storage device 15 includes a hard disc drive and the like. FIG. 2 is a schematic diagram showing the contents stored in the storage device 15 in FIG. 1. The storage device 15 stores a navigation program 21 and navigation data. The navigation data includes a waypoint data group 23, map data 24, a link data group 25, a node data group 26 and a cost coefficient list 27.

The navigation program 21 and the navigation data stored in the storage device 15 may be kept in the storage device 15 via a computer readable recording medium or transmission medium such as a DVD (Digital Versatile Disc)-ROM (Read Only Memory) and the like.

The navigation program 21 and the navigation data may be stored in a computer readable recording medium. In such a case, the storage device 15 includes the recording medium and a drive for reading data on the recording medium.

The waypoint data group 23 in the navigation data includes a plurality of records. Each record of the waypoint data group 23 includes data of one waypoint. The data of one waypoint includes names of buildings, shops and facilities placed at the waypoint and position information of the waypoint. A plurality of waypoints stored in the waypoint data group 23 are waypoints which can be selected as a destination, a position to be passed through or departure place.

The map data 24 is data used for displaying a map on a liquid crystal display. The map data 24 may be two-dimensional or three-dimensional vector map data 24, for example. The vector map data 24 includes background data to make a background image of a map and vector data drawn on the background image. The background image is image data that uses different colors for a playground, a river, a pond and the like. The vector data is drawing data for each road, for example. The map data 24 may further include three dimensional polygon data for landmark and icon data associated with each waypoint. The map data 24 has information for specifying a position of each waypoint on the map displayed based on the map data 24.

The link data group 25 and the node data group 26 are data that is used by the car navigation system in route searching or route guiding for a vehicle. The vehicle moves on a road. The road has road branch points such as an intersection. The navigation system treats the road branch points or the like as a node. The road between two branch points is treated as a link. Both ends of the link are connected with a node. To the node, one or more links are connected. As such, the road is made into data as a plurality of links and a plurality of nodes.

The link data group 25 has a plurality of records. Each record of the link data group 25 has data of a link. Each record has traffic regulation information relating to the link, a distance of the link, cost information for passing through the link, identification number unique to the link, and an identification number of a node that is connected with the link. The traffic regulation information relating to the link includes information on a passage of one-way traffic, a passage closed for a certain period, no right-turn, U-turn prohibition, a road width (a width of a road) and the like. Each record needs not to be associated with a link and may be collectively associated with a plurality of links with certain relationship. The plurality of links with certain relationship includes a plurality of links associated with a road in a certain section on a national road with a certain number, for example.

The node data group 26 has a plurality of records. Each record of the node data group 26 has data of one node. Each record has position information of the node, traffic regulation information relating to the node, cost information for passing through the node, identification number unique to the node, and an identification number of a link that is connected with the node. The traffic regulation information relating to the node includes information on the presence of a traffic light, no right-turn, U-turn prohibition and the like. Each record may be collectively associated with a plurality of nodes with certain relationship instead of a node. The plurality of nodes with certain relationship includes a plurality of nodes associated with a road in a certain section on a national road with a certain number, for example.

Each of the cost information for passing through a node and the cost information for passing through a link has a value according to how easy or how hard to pass through the node or the link. The harder the node or the link to be passed through, the bigger the value of the cost information is. The value of the cost information may be a value according to whether the road is a toll-highway or toll-free highway, a value according to how convenient it is for a vehicle runs through, a value according to how beautiful the landscape is, a value according to the traffic of the road, or a value combining the abovementioned values, instead of a value only according to the easiness of the passage.

Each record may have a plurality of types of cost information that can be selected based on predetermined conditions. The cost information actually used in calculation may be stored in the storage device 15 in association with the type of road, for example. Each of the node data group 26 and the link data group 25 may have a data structure with specification information on a type for each record.

The cost coefficient list 27 has a plurality of coefficients used in calculating a cost. As a coefficient used in calculating a cost, a jam coefficient may be included, for example.

The jam coefficient is a coefficient for selecting a crowded route in a subordinated manner. The jam coefficient in the first embodiment has a value more than one. The jam coefficient is multiplied with the cost information of the link and the node corresponding to the crowded road.

The navigation program 21 realizes various functions for generating a guiding route and various functions for guiding a route based on the generated guiding rote in the main computer 1 when the program 21 is executed by the CPU 2.

Figure 3:
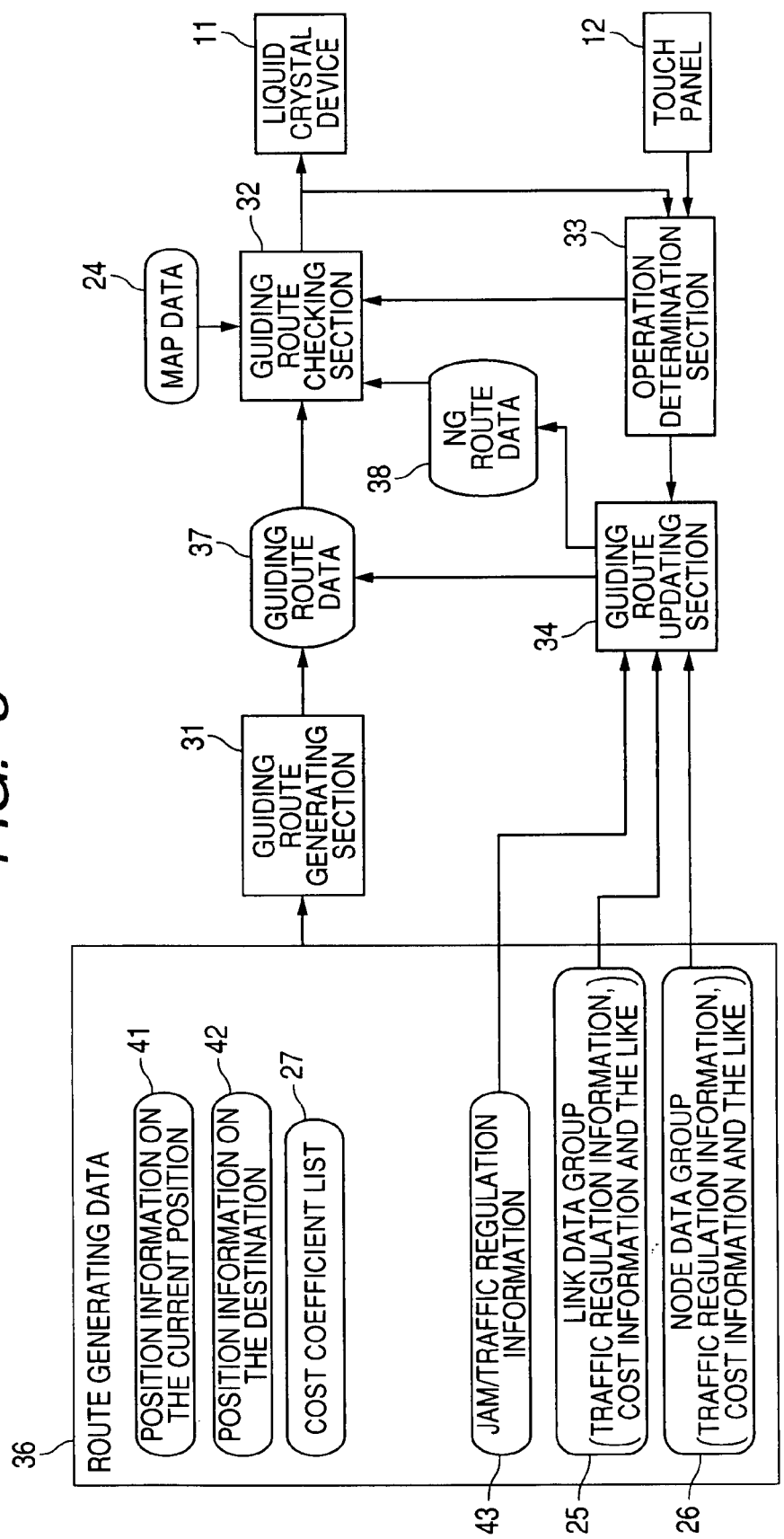
FIG. 3 is a block diagram showing a function realized by a car navigation system when a route is generated in the car navigation system according to a second embodiment of the present invention.

FIG. 3 is a block diagram showing a function realized in the car navigation system when a route is generated when the CPU 2 in FIG. 1 executes the navigation program 21. When the CPU 2 in FIG. 1 executes the navigation program 21, a guiding route generating section 31, a guiding route checking section 32, an operation determination section 33 as detecting means, a guiding route updating section 34 as specifying means, specified route determining means, generating means and updating means are realized. When a destination or the like is selected, the CPU 2 realizes the function. With the functions realized, the car navigation system generates a guiding route from the current position or the like to the destination or the like.

The guiding route generating section 31 generates guiding route data 37 by using route generating data 36. The guiding route generating section 31 causes the storage device 15 to store the generated guiding route data 37.

The route generating data 36 is stored in the storage device 15. The route generating data 36 used by the guiding route generating section 31 in generating the guiding route includes position information on the current position 41, the position information on the destination 42, cost coefficient list 27, jam/traffic regulation information 43, a link data group 25 and a node data group 26 or the like.

The position information on the current position 41 is position information indicating the current position of a vehicle. The position information of the current position 41 is updated by the position information output by the GPS receiver 13. The input/output port 4 may be connected with a vehicle speed pulse generator for outputting a vehicle speed pulse that changes according to a travel speed of the vehicle, or a gyro sensor for outputting a stature signal according to the stature (direction) of a vehicle so as to calculated the position information of the current position of the vehicle based on the information and update the position information of the current information 41 with the calculated position information.

The position information of the destination 42 is the position information indicating the destination of the vehicle. The position information of the destination 42 is updated with the position information of a waypoint selected by the touch panel 12 based on the waypoint data group 23 or the map data 24, for example.

The jam/traffic regulation information 43 is information indicating the current crowded road or the road under the traffic regulation. The jam/traffic regulation information 43 is updated by the traffic information output from the VICS receiver 14.

The guiding route data 37 generated by the guiding route generating section 31 has position information on a starting point of the guiding route, position information on an ending point of the guiding route and a list of links and nodes as a guiding route from the starting point to the ending point. In the list of links and nodes, each link and each node are specified by identification information in the link data group 25 and node data group 26, respectively. A plurality of links and nodes are arranged in an order of passage in a guiding route from the starting point to the ending point.

The guiding route checking section 32 generates display data on a check screen for a guiding route and outputs it to the liquid crystal device 11. The liquid crystal device 11 displays the check screen for a guiding route.

The operation determination section 33 determines an operation by a user with the touch panel 12 according to the display screen of the liquid crystal device 11. When a position on the touch panel 12 corresponding to the guide starting button 75 (to be described later) displayed on the check screen for a guiding route is operated, the operation determination section 33 determines that it is indicated to start guiding. When an arbitrary position on a map displayed on a check screen for a guiding route is operated, for example, the operation determination section 33 determines that the user-specifies the arbitrary position to pass through.

The guiding route updating section 34 updates the guiding route data 37 stored in the storage device 15. The guiding route updating section 34 specifies the user-specified road to pass through based on positions on a map specified by the user to pass through and the link data group 25 and the node data group 26, and updates the guiding route data 37 based on the identified road. If the user-specified pass-through road is unavailable for passage, the guiding route updating section 34, stores the road in the storage device 15 as NG route data 38.

Figure 4:
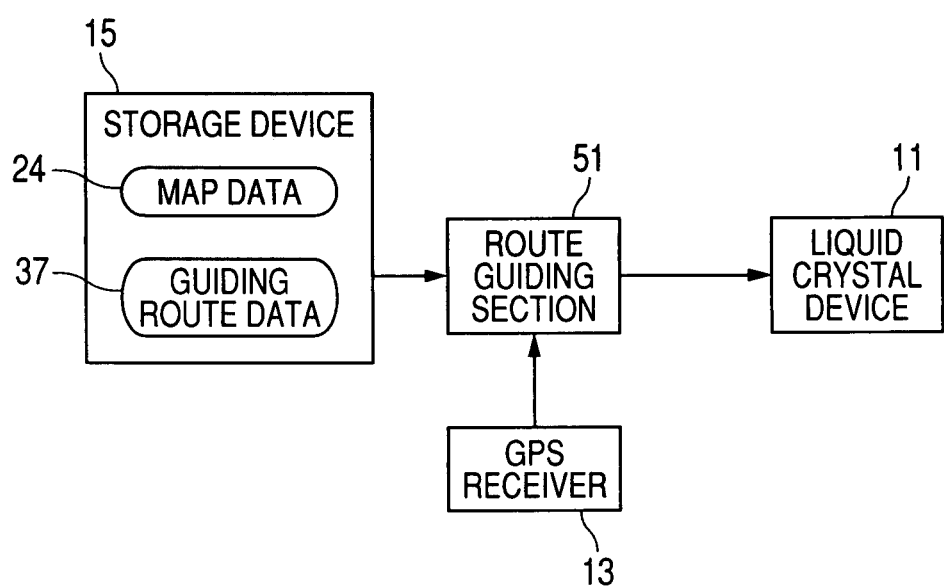
FIG. 4 is a block diagram showing a function realized by the car navigation system when a route is generated as the CPU in FIG. 1 realizes the car navigation program.

FIG. 4 is a block diagram showing a function realized in the car navigation system when a route is guided as the CPU 2 in FIG. 1 executes the car navigation program 21. The route guiding section 51 is realized as the CPU 2 in FIG. 1 executes the navigation program 21. When it is indicated to start guiding, the CPU 2 realizes the function. With the function realized, the car navigation system guides a route to the destination based on the guiding route.

The guiding route section 51 generates display data on the display screen for guiding a route and outputs it to the liquid crystal device 11. The liquid crystal device 11 displays a display screen of guiding a route. On the display screen of guiding a route, a map of the nearby area of the current position of the vehicle, a mark indicating the current position of the vehicle, and a guiding route in the map of the nearby area are shown.

Figure 5A:
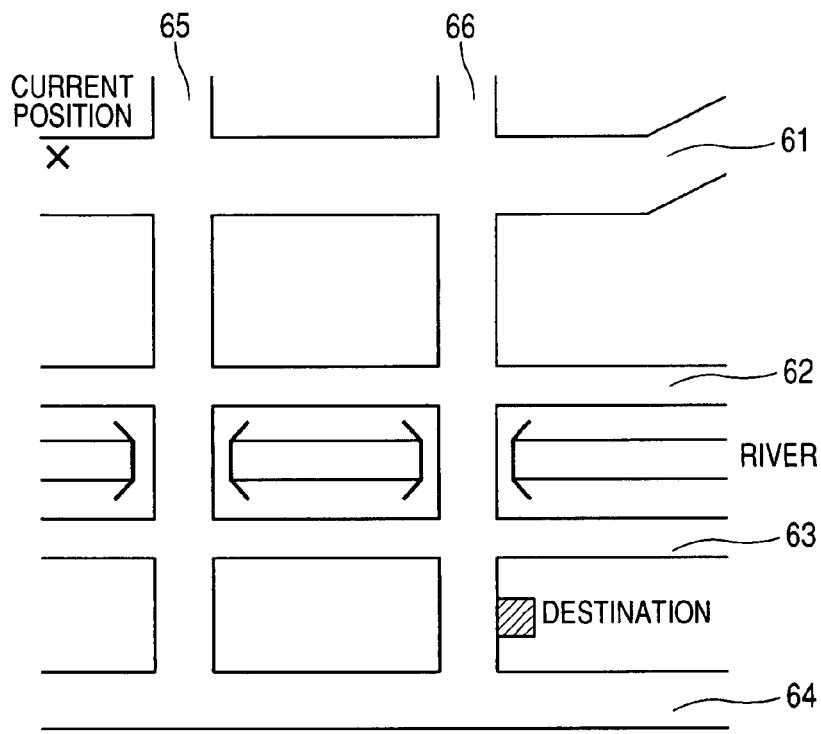
FIG. 5 is, A is a diagram showing a road map of a certain area, and B is a diagram showing a link and a node associated with roads in the area of A.
Figure 5B:
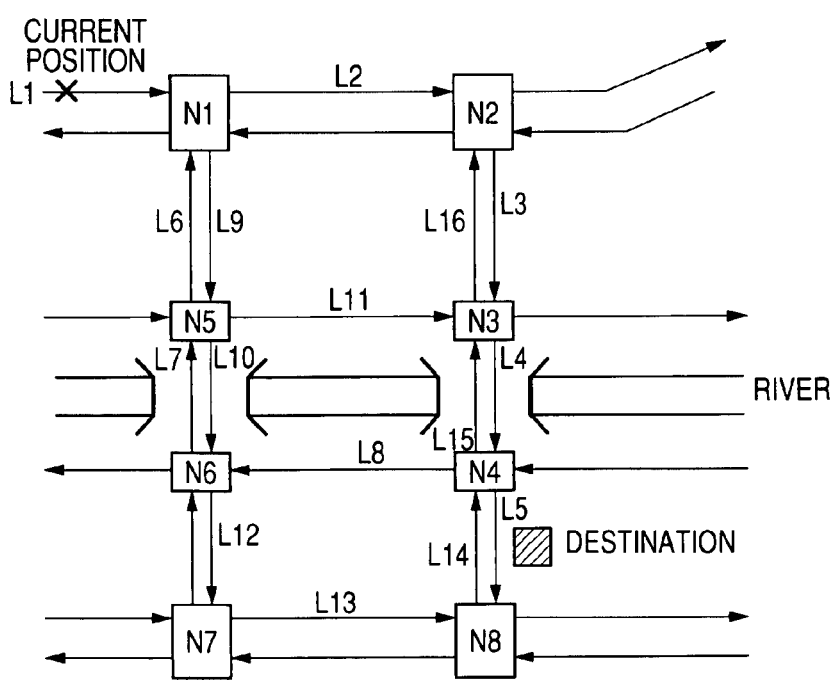

Now, operations of the car navigation system according to the first embodiment with the abovementioned arrangement will be described. FIG. 5 (A) is a diagram showing a road map of a certain area. FIG. 5 (B) is a diagram showing a link and a node associated with a road in the area shown in FIG. 5 (A).

The area shown in FIG. 5 (A) includes four roads almost in parallel with a river. Hereinafter, the roads are called a first road 61, a second road 62, a third road 63 and a fourth road 64 from the top of FIG. 5 in order. The second road 62 located above the river in FIG. 5 (A) is a one-way street that is available from left to right in FIG. 5 (A). The third road 63 located under the river in FIG. 5 (A) is a one-way street that is available from right to left in FIG. 5 (A). The first road 61 and the second road 62 are two-way streets. The area of FIG. 5 (A) includes two two-way streets vertical to the river. Hereinafter, the roads are called the fifth road 65 and the sixth road 66 from left in order in FIG. 5. Two bridges cross over the river. The fifth road 65 and the sixth road 66 pass over the bridge over the river.

As shown in FIG. 5 (B), a node is associated with an intersection of roads. A link is associated with each road for each section between two intersections. Two links are associated with a two-way street for each section between two intersections. The directions of the two links of the two-way street are inversed to each other.

First, searching processing on a guiding route will be described with reference to FIG. 5. When the current position of a vehicle is at the upper left on FIG. 5 and a destination is selected on a position adjacent to the sixth road 66 between the third road 63 and the fourth road 64 on the touch panel 12, the position information 42 of the destination included in the route generating data 36 is updated to the position of the selected destination. The destination only needs to be selected based on the waypoint data group 23 and the map data 24, for example.

When the position information of the destination 42 is updated, the guiding route generating section 31 starts generating the guiding route data 37 by using the updated route generating data 36. Specifically, the guiding route generating section 31 first selects the position information on the current position 41 included in the route generating data 36 as a starting point of searching and selects the position information on the destination 42 included in the route generating data 36 as an ending point of searching.

After selecting the starting point and the ending point of the guiding route, the guiding route generating section 31 searches a candidate route from the starting point to the ending point by using the link data group 25 and the node data group 26. The candidate route is a route where a vehicle can pass. The guiding route generating section 31 passes from the starting point of searching through the links and nodes in order which can be passed by a vehicle by using the traffic regulation information updated based on the traffic regulation information stored in the link data group 25 and the node data group 26 or the traffic regulation information updated based on the received information of the VICS receiver 14 to search a route reaches the end point of the searching. If the starting point and the ending point are the current position and the destination of the vehicle shown in FIG. 5 (A), the guiding route generating section 31 searches a candidate route from the starting point to the ending point of the searching by using the node and link shown in FIG. 5 (B).

After the route from the starting point to the ending point of the searching has been searched, the guiding route generating section 31 calculates the passage cost for the candidate route. Specifically, the guiding route generating section 31 adds up costs of the links included in the candidate route by using cost information stored in the link data group 25 and the node data group 26 as the costs of the links included in the candidate route to make it the passage cost for the candidate route. Moreover, the guiding route generating section 31 uses the cost information in the link data group 25 and the node data group 26 multiplied with a jam coefficient stored in the cost coefficient list 27 as the cost for the links and nodes which are taken as crowded section in the jam/traffic regulation information 43 and adds the costs to make it the passage cost of the candidate route.

Further, the guiding route generating section 31 searches a plurality of candidate routes from the starting point to the ending point of the searching. Then, the guiding route generating section 31 selects a candidate route with the minimum passage cost from the plurality of searched out candidate routes. The guiding route generating section 31 stores the guiding route data 37 of the guiding route in the storage device 15. Accordingly, the guiding route data 37 is stored in the storage device 37.

In FIG. 5 (A), a route for a vehicle to move on the first road 61 to right on the figure, turn to right into the sixth road 66 at the intersection, further goes straight over the river to the destination is generated as a guiding route from the current position to the destination, the guiding route generating section 31 stores "link L1→node N1→link L2→node N2→link L3→node N3→link L4→node N4→link L5" in FIG. 5 (B) in the storage device 15 as the guiding route data 37 including a list of link and node.

Figure 6:
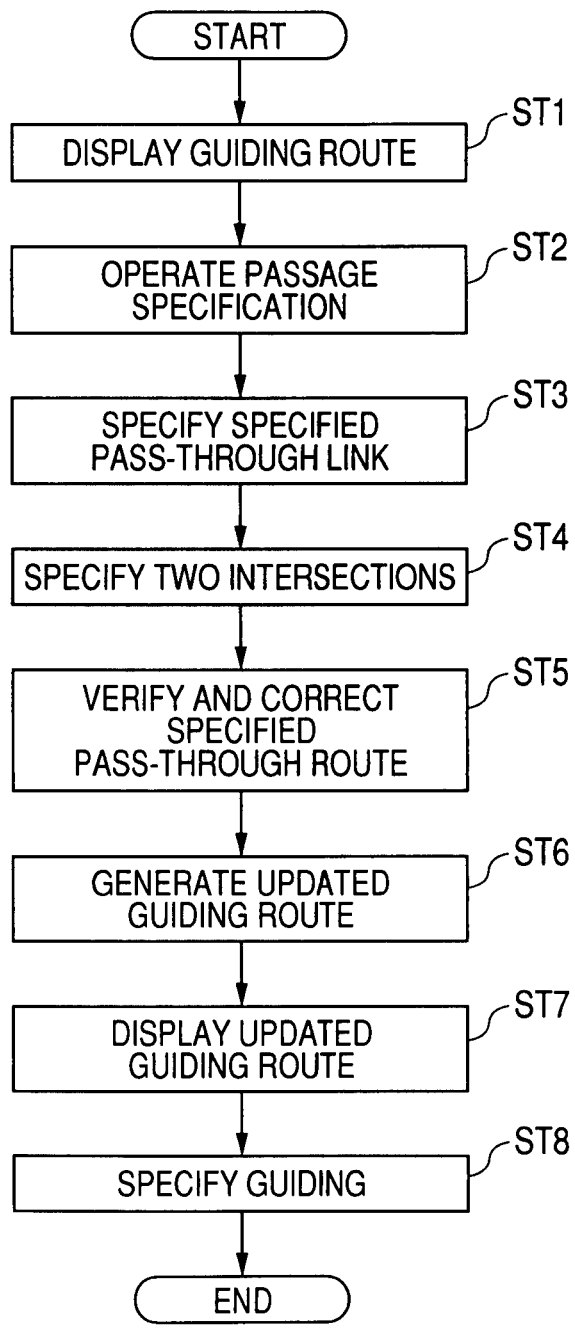
FIG. 6 is a flowchart 1 showing updating processing of a guiding route after guiding route data is generated by a guiding route generating section.

FIG. 6 is a flowchart showing updating processing of the guiding route after the guiding route data 37 is generated by the guiding route generating section 31.

When the guiding route data 37 is stored in the storage device 15, the guiding route checking section 32 generates display data on the check screen for a guiding route. Specifically, the guiding route checking section 32 first generates a map screen in a range that includes the entire guiding route based on the map data 24 stored in the storage device 15. On the map screen, roads nearby the guiding route are displayed according to the scale of display. Next, the guiding route checking section 32 draws the guiding route, a mark of the current position and a mark of the destination on the map screen based on the guiding route data 37. Then, the guiding route checking section 32 outputs display data of the check screen for a generated guiding route to the liquid crystal device 11. The liquid crystal device 11 displays the check screen for a guiding route (step ST1).

Figure 7:
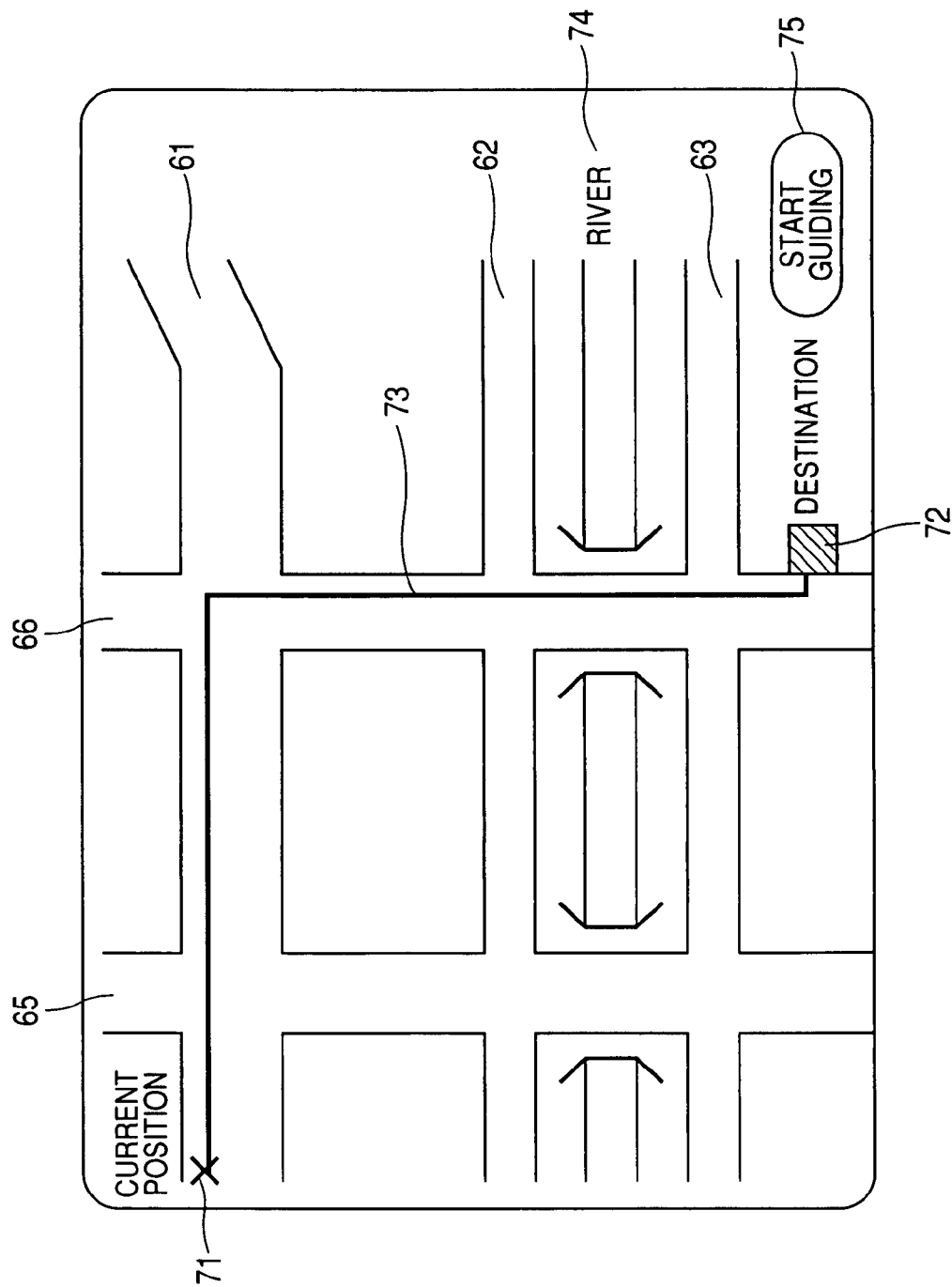
FIG. 7 is a diagram showing an example of a check screen for a guiding route displayed on a liquid crystal device in FIG. 1.

FIG. 7 is a diagram showing an example of a check screen for a guiding route displayed on a liquid crystal device 11 in FIG. 1. On the check screen for a guiding route of FIG. 7, a mark of the current position 71, a mark of the destination 72, and a thick line 73 indicating the guiding route are displayed. The thick line 73 indicating the guiding route is drawn over the first road 61 and the sixth road 66. The thick line 73 indicating the guiding route starts from the mark of the current position 71 and ends at the mark of the destination 72.

On the check screen for a guiding route in FIG. 7, a river 74 and roads 61, 62, 63, 65, 66 of the map in the displayed range of the display screen are displayed based on the map data 24. At the lower right of the screen, the guiding start button 75 is displayed.

The user can check the guiding route generated by the guiding route generating section 31 on the check screen for a guiding route displayed on the liquid crystal device 11.

The guiding route checking section 32 generates a check screen for a plurality of guiding routes that are a check screen for a guiding route shown in FIG. 7 divided into a predetermined number (for example, four) and displays them in order on the liquid crystal device 11 based on scrolling operation by a user.

Figure 8:
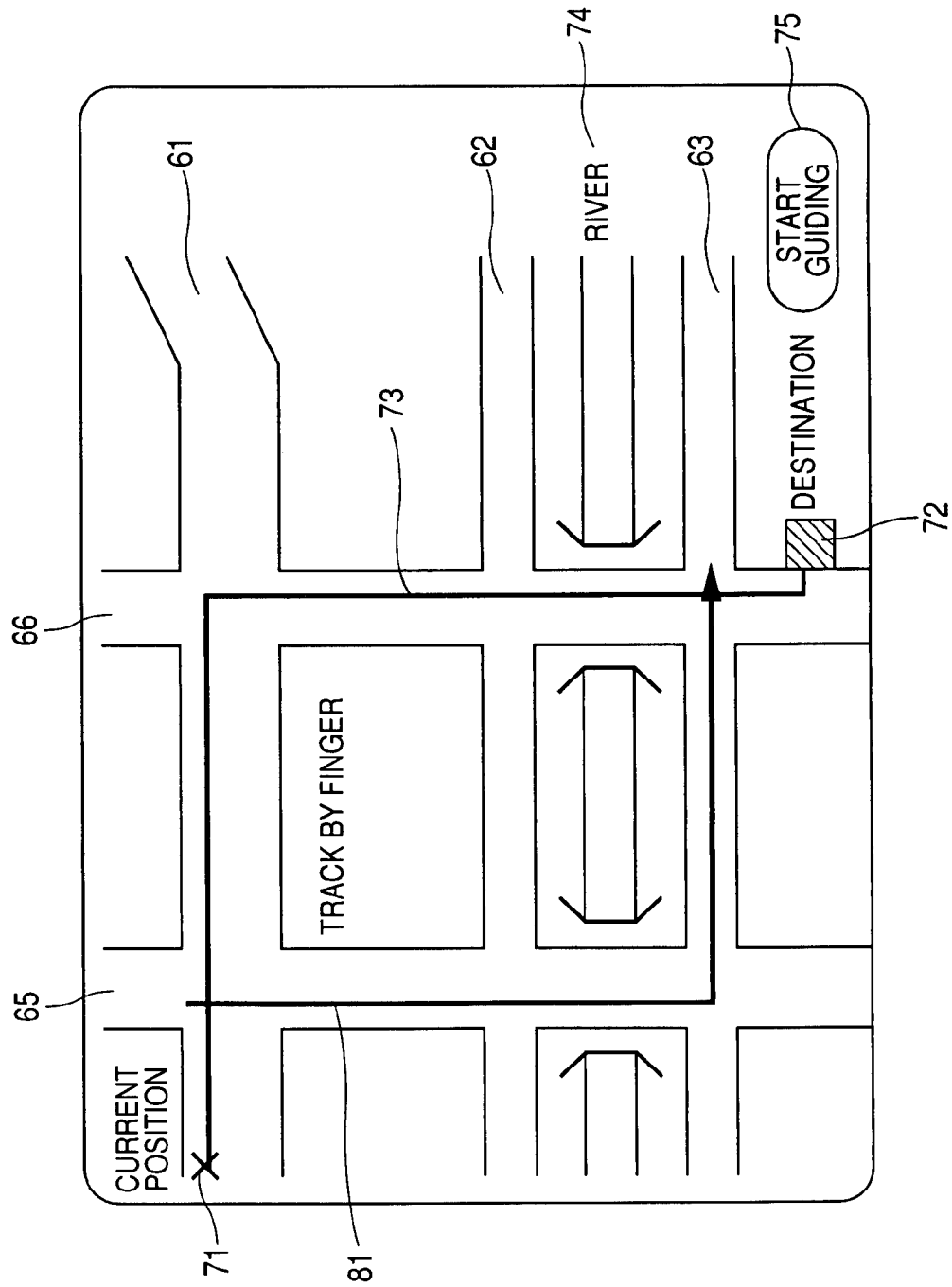
FIG. 8 is a schematic diagram for illustrating how to operate passage specification by a user for setting a road to be passed on a check screen for a guiding route shown in FIG. 7.

When the check screen for a guiding route shown in FIG. 7 is displayed on the liquid crystal device 11 and the user tracks a road on the displayed map (here, the fifth road 65 and the third road 63) as shown as an arrow 81 in FIG. 8, operation position information is output from the touch panel 12 superimposed on the display section of the liquid crystal device 11 (step ST2). FIG. 8 is a schematic diagram for illustrating how to operate the passage specification by a user for setting a road to be passed on a check screen for a guiding route shown in FIG. 7.

The operation determination section 33 generates position information on the map corresponding to the operated position (the position over which an arrow 81 is shown for example in FIG. 8) based on the operation position information from the touch panel 12 and the display data of the check screen for a guiding route. The operation determination section 33 outputs the generated position information on the map to the guiding route updating section 34.

When the position information on the map is input from the operation determination section 33, the guiding route updating section 34 specifies a user-specified pass-through road. Specifically, the guiding route updating section 34 specifies the link nearest to the position on the map that is specified by the user to pass through among roads displayed on the liquid crystal device 11 as a link of a user-specified pass-through road (step ST3).

When the user specifies the fifth road 65 and the third road 63 as a passage road as an arrow 81 in FIG. 8, the guiding route updating section 34 specifies the link L6, the link L7 and the link L8, for example, as links of the user-specified road.

After the user specifies links of the specified pass-through road, the guiding route updating section 34 specifies two intersections of the user-specified pass-through road and the guiding route generated by the guiding route generating section 31. The two intersections are an inlet and an outlet to and from the user-specified pass-through road. If the link L6, the link L7 and the link L8 are identified as links of the user-specified pass-through road, the guiding route updating section 34 specifies the node N1 to which the link L6 is connected and the node N4 to which the link L8 is connected as two intersections (step ST4).

After specifying the two intersections, the guiding route updating section 34 generates a route formed by the user-specified road between two intersections. If the node N1 and the node N4 are identified as two intersections, the guiding route updating section 34 generates a route of "link L6→the node N5→the link L7→node N6→link L8".

After generating the user-specified pass-through route between the two intersections, the guiding route updating section 34 passes through the links and nodes in the route in order and verifies whether a route can go through the starting point (here the current position 71) to the ending point (here the destination 72) of the searching or not (step ST5). The guiding route updating section 34 verifies the links and nodes in the route by using the link data group 25, the node data group 26 and the jam/traffic regulation information 43 and the like. If the guiding route updating section 34 has a link of a road that is unavailable for passage, it replaces the link of the road that is unavailable for passage for the link of the road that is available for passage.

The guiding route updating section 34 first determines whether it is available for passage or not from the starting point of the searching in order for the links one by one in a section between the two intersections. The guiding route updating section 34 determines whether it is available for passage or not based on whether the direction of each link matches the direction from the starting point (here, the current position 71) and the ending point (here, the destination 72) or not.

Here, the guiding route updating section 34 determines whether it is available for passage or not for the link L6, the link L7 and the link L8 one by one in order. The guiding route updating section 34 first determines whether the direction of the link L6 matches the direction from the node N1 to the node N5 or not. The link L6 is a link in a direction from the node N5 to the node N1. Accordingly, the guiding route updating section 34 determines that the link L6 is unavailable for passage.

If a link unavailable for passage is included in the guiding route, the guiding route updating section 34 replaces the link with another link. The guiding route updating section 34 first searches the link data group 25 to determine the presence of the link of the same road as the link unavailable for passage in a direction reverse to the link unavailable for passage. If a link in a direction reverse to the link unavailable for passage is present, the guiding route updating section 34 replaces the link unavailable for passage with the link in the reverse direction. For the link L6, there is the link L9 as a link in the reverse direction. Accordingly, the guiding route updating section 34 replaces the link L6 with the link L9. As a result, the route kept by the guiding route updating section 34 is updated to "the link L1→the node N1→the link L9→the node N5→the link L7→the node N6→the link L8→the node N4→the link L5".

When the link L6 is verified and replaced with another one, the guiding route updating section 34 verifies the next link L7. The direction of the link L7 is the direction from the node N6 to the node N5. Therefore, the guiding route updating section 34 determines that the link L7 is unavailable for passage. The guiding route updating section 34 replaces the link L7 with the link L10 with the reverse direction. Accordingly, the route kept by the guiding route updating section 34 is updated to "the link L1→the node N1→the link L9→the node N5→the link L10→the node N6→the link L8→the node N4→the node N4→the link L5".

When the link L7 is verified and replaced with another one, the guiding route updating section 34 verifies the next link L8. The direction of the link L8 is the direction from the node N4 to the node N6. Therefore, the guiding route updating section 34 determines that the link L8 is unavailable for passage. The link L8 is a one-way passage link and has no link in the reverse direction.

Therefore, the guiding route updating section 34 determines that the third user-specified road is unavailable as a part of the route in the direction from the starting point to the ending point of the guiding route. After confirming that there is no link with a reverse direction, the guiding route updating section 34 performs generating processing on the alternative route by using the node N6 as the starting point of the searching and the node N4 as the ending point of the searching. The guiding route updating section 34 generates an alternative route from the node N6 to the node N4 by using the route generating data 36 with the same processing as the guiding route generating section 31.

Then, after generating the route "the node N6→the link L7→the node N5→the link L11→the node N3→the link L4→the node N4", for example, by the generating processing of the alternative route from the node N6 to the node N4, the guiding route updating section 34 updates the route of a section from the node N6 to the node N4 in the guiding route with the generated alternative route. Accordingly, the route kept by the guiding route updating section 34 as a user-specified pass-through route between the two intersections is updated to "the link L9→the node N5→the link L10→the node N6→the link L7→the node N5→the link L11→the node N3→the link L4".

The route kept by the guiding route updating section 34 as a user-specified pass-through route between the two intersections includes the node N5 twice. Therefore, the guiding route updating section 34 deletes a section that becomes between the nodes N5. Accordingly, the route kept by the guiding route updating section 34 as a user-specified pass-through route between the two intersections is updated to "the link L9→the node N5→the link L11→the node N3→the link L4".

When verification and required replacement have performed on all the links in the user-specified pass-through route between the two intersections, the guiding route updating section 34 updates the guiding route data 37 stored in the storage device 15 with the route kept at that moment. The guiding route updating section 34 updates the route between the two intersections of the guiding route data 37 generated by the guiding route generating section 31 with the keeping user-specified pass-through route (step ST6).

Accordingly, the route "the link L1 the node N1→the link L9→the node N5→the link L11→the node N3→the link L4→the node N4→the link L5" is stored in the storage device 15 as the guiding route data 37. The guiding route by the guiding route data 37 is the route available for passage from the starting point to the ending point. The updated guiding route data 37 is such as the route of a section from the node N1 to the node N4 is the route based on the user-specified pass-through road. The route of a section from the node N1 to the node N4 is such as the route combining the link L9 of the fifth user-specified pass-through road, the links L11, L4 and the node N3 of the alternative route generated based on the passage specification by the user.

The guiding route updating section 34 stores information on the road which is not to be passed in the guiding route among the user-specified roads in the storage device 15 as the NG route data 38. In this case, the guiding route updating section 34 stores the link L8 and the link L7, which is the links of the road in the section that is deleted from the guiding route caused by the route generating processing, in the storage device 15 as the NG route data 38.

When the guiding route data 37 stored in the storage device 15 is updated, the guiding route checking section 32 generates the display data of the check screen for an updated guiding route by using the updated guiding route data 37 and the map date 24, and causes the check screen for an updated guiding route to be displayed on the liquid crystal device 11. The guiding route checking section 32 also causes the link included in the NG route data 38 to be displayed on the check screen for a guiding route as a road unavailable for passage (step ST7).

FIG. 9A is a diagram showing an example of a check screen for a guiding route updated based on FIGS. 6, 7, and 8 that is displayed on the liquid crystal device 11 in FIG. 1. The guiding route displayed in FIG. 9A is a route to the destination 72 from the current position through the first road 61, the fifth road 65, the second road 62, and the sixth road 66. The guiding route includes the fifth road 65 that is a user-specified pass-through road. On the check screen for a guiding route in FIG. 9A, a dashed line 91 is displayed based on the link L8 and the link L7 included in the NG route data 38 on the road that is not passed through in the guiding route in the user-specified road.

Accordingly, the user can check the guiding route, in which the user-specified road is passed through, on the check screen for a guiding route. The user can check the road unavailable for passage due to traffic regulation or the like among the roads the user-specified to pass through.

With the abovementioned processing, the car navigation system can generate the guiding route up to the destination through the roads the user wants to pass through. The guiding route is to be a route available for traffic.

When the guide starting button 75 is operated on the check screen for a guiding route shown in FIG. 9A, the operation determination section 33 determines that it is instructed to start guiding (step ST8). As a result, the car navigation system stars the route guiding processing for guiding the route for a vehicle to move through the generated guiding route.

When the route guiding processing starts, the route guiding section 51 generates a map of the periphery of the current position of the vehicle with the map data 24 by using the position information output by the GPS receiver 13 as the current position information of the vehicle as shown in FIG. 4. The route guiding section 51 draws a mark indicating the current position of the vehicle and the guiding route in the map of the periphery on the generated map. The mark indicating the current position of the vehicle may be at a position according to the position information of the GPS receiver 13 or the position identified in map matching from that position. The route guiding section 51 outputs the display data on the display screen for the generated route guiding on the liquid crystal device 11. The liquid crystal device 11 displays the display screen for the route guiding.

When the position information of the GPS receiver 13 changes, the route guiding section 51 updates the display data on the display screen for the route guiding. The route guiding section 51 generates the display screen for route guiding, in which the changed position information is made as the current position of the vehicle. Accordingly, the map of the periphery of the current position of the vehicle, the current position of the vehicle in the map, and the guiding route are kept being displayed on the liquid crystal device 11.

Therefore, the user can reach the destination from the current position through a predetermined route that is specified by the user by driving the vehicle so that a mark 82 indicating the current position of the vehicle moves on the guiding route 84 on the map displayed in the liquid crystal device 11.

As mentioned above, the car navigation system according to the first embodiment displays the roads in the periphery on the check screen for a guiding route generated based on the setting of the destination. The user can change it to the guiding route that passes through a desired road by operating to specify passage on the road in the periphery.

The road that is specified by the user to pass through is verified for whether it is available for traffic as a guiding route based on the links of the road. If the road specified by the user to pass through is not available for traffic, the guiding route in which the road is replaced for the road available for traffic is generated. On the check screen for a guiding route, the road unavailable for passage among the roads specified by the user is clearly shown along with the guiding route in which the road is replaced for the road available for passage. Therefore, the user can check that the roads that are specified by the user include a road that is inappropriate for the guiding route.

As mentioned above, the car navigation system according to the first embodiment can generate the guiding route available for traffic up to the destination through the user-specified pass-through road. The car navigation system according to the first embodiment can guide by using the guiding route.

Second Embodiment

The car navigation system according to the second embodiment is for generating a new guiding route by connecting the specified route that is identified based on the user's instruction for passage and the guiding route generated by the guiding route generating section 31 even if the identified route and the guiding route are not crossing at two points. The car navigation system according to the second embodiment not only determines whether the route specified by the user to pass through is available for traffic or not but also determines whether the connecting node between the specified pass-through route and the guiding route generated by the guiding route generating section 31 is available for traffic or not, and according to the determination, guides different routes.

Figure 10:
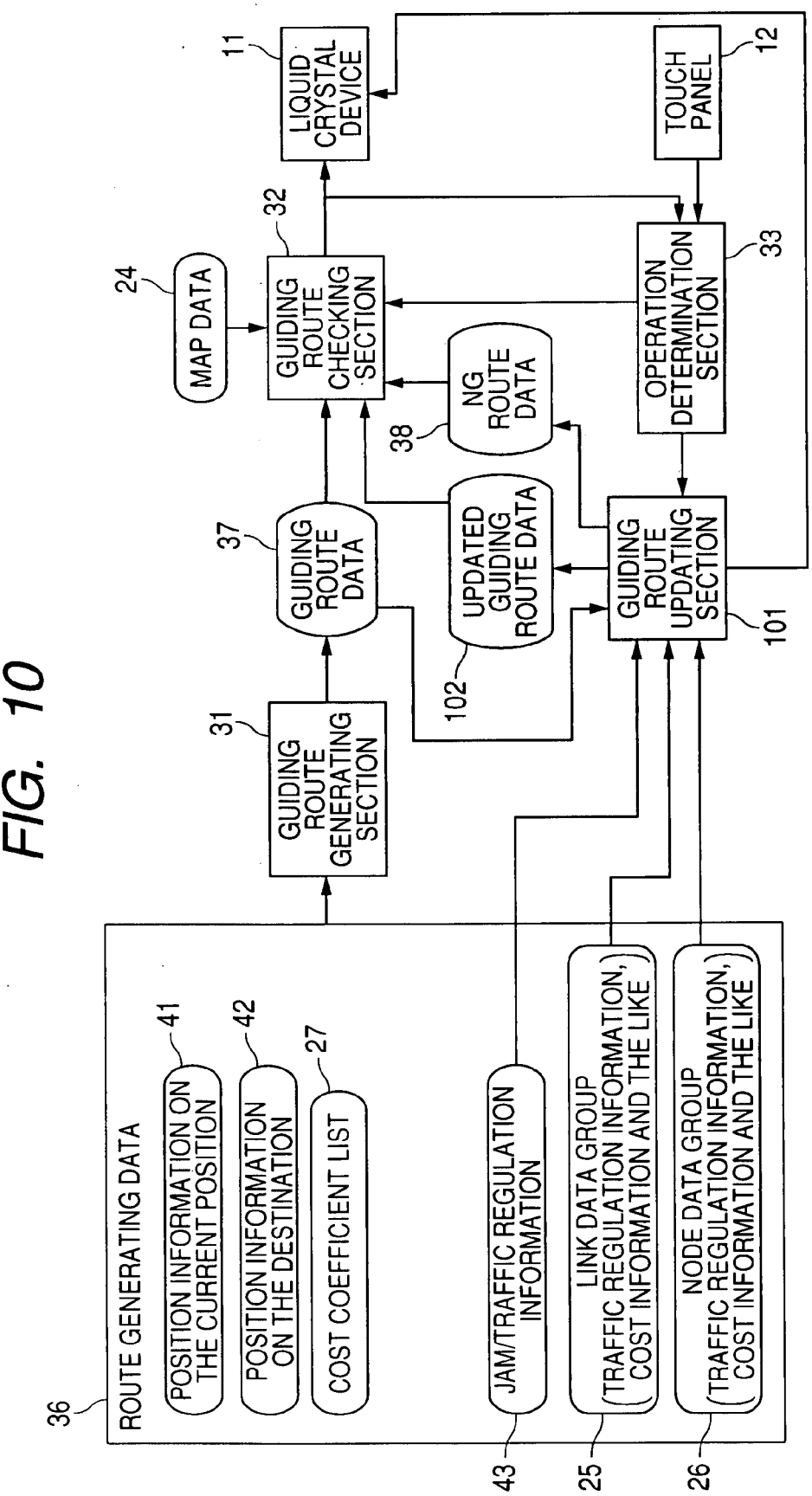
FIG. 10 is a block diagram showing a function realized when a route is generated in the car navigation system according to the second embodiment of the present invention.

FIG. 10 is a block diagram showing a function realized when a route is generated in the car navigation system according to the second embodiment of the present invention. The hardware arrangement is the same as that shown in FIG. 1 and the arrangement of the storage device is the same as that shown in FIG. 2. In the car navigation system, a guiding route generating section 31, a guiding route check section 32, an operation determination section 33 as detecting means, a guiding route updating section 101 as specifying means, specified route determination means, generating means, updating means, intersection determination means, second generating means, additional updating means, warning means and specifying means are realized.

The guiding route updating section 101 generates the updated guiding route data 102 by using the guiding route data 37 stored in the storage device 15. The guiding route updating section 101 specifies the user-specified pass-through road based on a position on a map that is specified by the user to pass through based on the display and the link data group 25 and the node data group 26, and generates the updated guiding route data 102 including the identified road. If the road specified by the user to pass through is unavailable for traffic, the guiding route updating section 101 stores the road in the storage device 15 as the NG route data 38.

The car navigation system according to the second embodiment has the same functions as those with the same names in the first embodiment, thus, they are given the same reference numerals as in the first embodiment and they will be omitted from the figures and descriptions.

Operations of the car navigation system according to the second embodiment with the abovementioned arrangement will be described below. As the generating processing of the guiding route until the guiding route data 37 generated by the guiding route generating section 31 is stored in the storage device 15 and the route guiding processing using the guiding route stored in the storage device are the same as the operation of the car navigation system according to the first embodiment, they will be omitted from the description.

Figure 11:
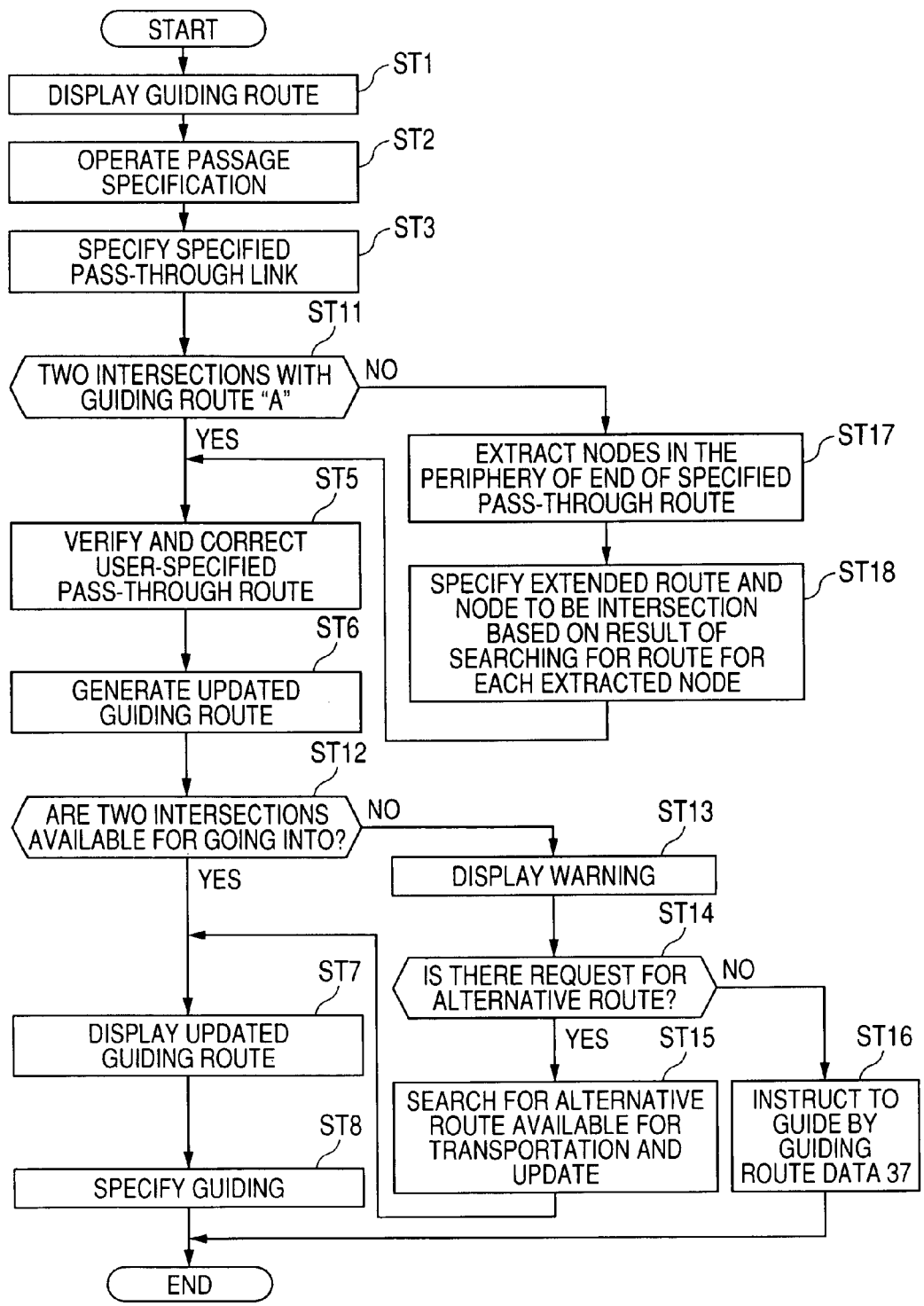
FIG. 11 is a flowchart 2 showing updating processing of the guiding route after guiding route data is generated by the guiding route generating section.

FIG. 11 is a flowchart showing updating processing of the guiding route after guiding route data 37 is generated by the guiding route generating section 31. The updating processing of the guiding route will be described with reference to FIG. 11 and FIG. 5, if required.

When the guiding route data 37 is stored in the storage device 15, the guiding route checking section 32 generates display data of the check screen for a guiding route. The guiding route checking section 32 displays a guiding route, a map for a range including the entire of the guiding route, a mark of the current position and a mark of the destination on the liquid crystal device 11 as shown in FIG. 7 (step ST1).

Figure 13:
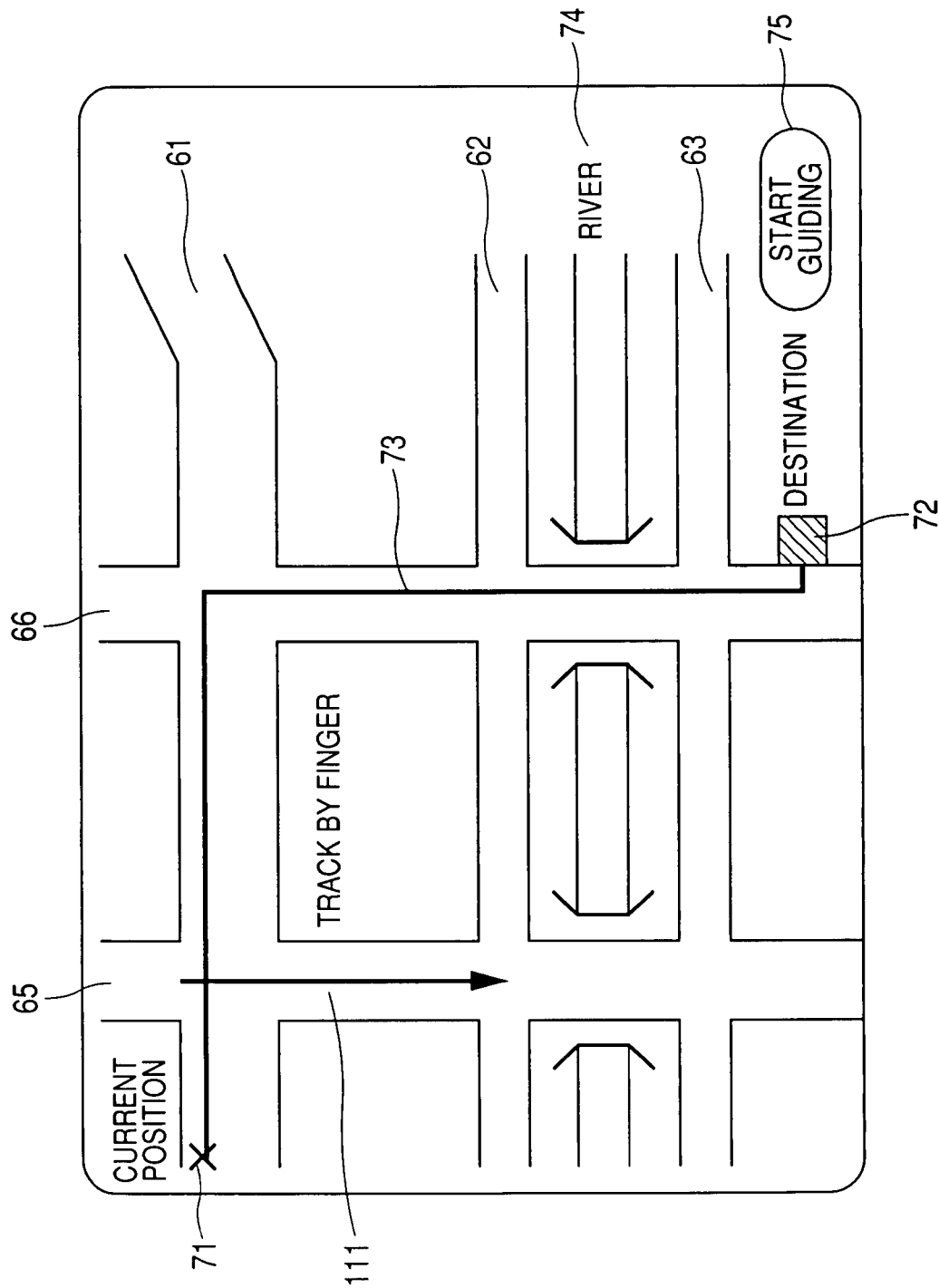
FIG. 13 is a schematic diagram for illustrating how to operate the passage specification by a user for setting a road to be passed on a check screen for a guiding route shown in FIG. 7 in another way.

When the check screen for a guiding route as shown in FIG. 7 is displayed on the liquid crystal device 11, the user tracks the touch panel 12 superimposed on the display section of the liquid crystal device 11 (step ST2). In the case of the second embodiment, the user may track so as to cross at two points with the displayed guiding route 73 as shown as an arrow 81 in FIG. 8 or may track arbitrary places in the displayed map as shown as an arrow 111 in FIG. 13. FIG. 13 is a schematic diagram for illustrating how to operate the user-specified pass-through for setting a road to be passed on a check screen for a guiding route shown in FIG. 7 in another way.

When the user tracks as shown in FIG. 8, the operation determination section 33 outputs to the guiding route updating section 101 based on an operation position information from the touch panel 12 and the display data on the check screen for a guiding route as position information on a map corresponding to the operated position. The guiding route updating section 101 specifies the link nearest to the position on the map that is specified by a user to pass through as a link of the user-specified pass-through road among the roads displayed on the liquid crystal device 11 (step ST3). Specifically, the guiding route updating section 101 specifies the link L6 and the link L7 as the links of the user-specified pass-through road.

After specifying the link of the user-specified pass-through road, the guiding route updating section 101 determines whether the user-specified pass-through road and the guiding route generated by the guiding route generating section 31 are crossing at two points or not (step ST11). If they are crossing at two points, the guiding route updating section 101 specifies the two intersections by the same processing as that by the guiding route updating section 34 of the first embodiment, and performs verification processing and correction processing with the user-specified pass-through road between the two intersections (step ST5). In the case of FIG. 8, the guiding route generating section 31 specifies the node N1 and the node N4 as two intersections, generates the route "the link L6→the node N5→the link L7→the node N6→the link L8" as the route that is specified by the user to pass through, and verifies the route. The guiding route updating section 101 finally generates "the link L9→the node N5→the link L11→the node N3→the link L4" as the route that is specified by the user to pass through.

The guiding route updating section 101 connects the route that is specified by the user to pass through with the guiding route data 37 generated by the guiding route generating section 31 at the previously identified two intersections and generates the updated guiding route data 102. The guiding route updating section 101 stores the generated updated guiding route data 102 in the storage device 15 (step ST6). Accordingly, the route "the link L1→the node N1→the link L9→the node N5→the link L11→the node N3→the link L4→the node N4→the link L5" is stored in the storage device 15 as the updated guiding route data 102. The guiding route updating section 101 stores a section link deleted from the route that is specified by the user to pass through in the storage device 15 as the NG route data 38.

After generating the updated guiding route data 102, the guiding route updating section 101 further determines on the availability for traffic on the two intersections that connect the route that is specified by the user to pass through and the guiding route data 37. Specifically, the guiding route updating section 101 determines whether it is possible to pass through the link incoming into the node to the link going out from the node or not by referring to the node data group 26 for each node of the two intersections. If right turn is prohibited at the node N1, the guiding route updating section 101 determines that the node N1 is unavailable for traffic and that the other nodes are available for traffic.

When the updated guiding route data 102 that is available for traffic at the two intersections is stored in the storage device 15, the guiding route updating section 101 generates the display data of the updated check screen for a guiding route by using the updated guiding route data 102 and the map data 24, and displays the updated check screen for a guiding route on the liquid crystal device 11 as shown in FIG. 9A. The guiding route checking section 32 displays the link included in the NG route data 38 as the road unavailable for traffic on the check screen for a guiding route (step ST7).

When the guiding start button is 75 operated on the check screen for a guiding route in FIG. 9A, the operation determination section 33 determines that it is instructed to start the guiding (step ST8). Accordingly, the car navigation system starts the route guiding processing for guiding the route so that a vehicle moves on the generated guiding route.

If it is determined that it is unavailable for traffic at least at either of the two intersections that connect the route that is specified by the user to pass through with the guiding route data 37 in the determination for availability for traffic at the two intersections (step ST12), the guiding route updating section 101 displays a warning message indicating that the guiding route is unavailable for traffic (step ST13). If it is determined that a request for generating an alternative route is issued based on the input to the touch panel 12 (step ST14), the guiding route updating section 101 generates an alternative route available for transportation (step ST15).

If the updated guiding route data 102 that connects the node N1 and the node N3 as two intersections is such a route as "the link L1→the node N1→the link L9→the node N5→the link L11→the node N3→the link L4→the node N4→the link L5" and if the right turn is prohibited at the node N3 from the link L11 to the link L4, the guiding route updating section 101 determines that the route is unavailable for traffic and displays a warning message.

If the right turn is prohibited at the node N3 from the link L11 to the link L14, the guiding route updating section 101 searches for a route from the other node N5 that is connected to the link L11 to the node N3 unavailable for transportation, for example, to the node N3, and updates the route by the updated guiding route data 102 by using the route.

Specifically, the guiding route updating section 101 searches the route "the node N5→the link L10→the node N6→the link L12→the node N7→the link L13→the node N8→the link L14→the node N4→the link L15→the node N3" as a route from the node N5 to the node N3, updates the updated guiding route data 102 to "the link L1→the node N1→the link L9→the node N5→the link L10→the node N6→the link L12→the node N7→the link L13→the node N8→the link L14→the node N4→the link L15→the node N3→the link L4→the node N4→the link L5".

As the updated guiding route data 102 updated redundantly includes nodes, the guiding route updating section 101 finally deletes a route or the like between the redundant nodes and update the updated guiding route data, 102 to "the link L1→the node N1→the link L9→the node N5→the link L10 the node N6→the link L12→the node N7→the link L13→the node N8→the link L14".

Figure 12:
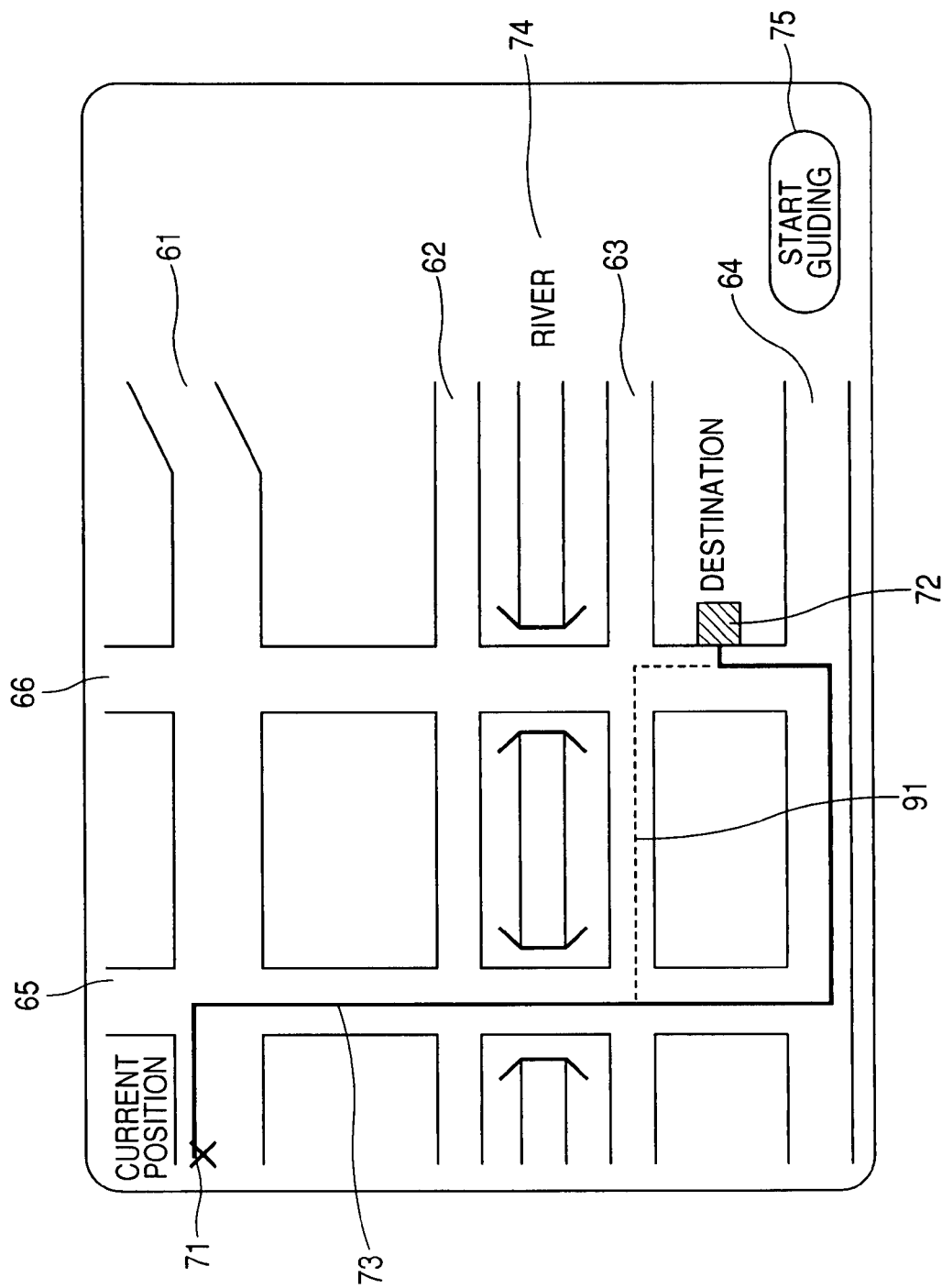
FIG. 12 is a diagram showing an example of a check screen for an updated guiding route displayed on a liquid crystal device in FIG. 10 after the same operation as that in FIG. 8 when it is prohibited to turn right at a node N 3.

When the updated guiding route data 102 is updated, the guiding route updating section 101 displays the updated check screen for a guiding route on the liquid crystal device 11 by using the updated guiding route data 102 which is updated and the map data 24 (step ST7). FIG. 12 is a diagram showing an example of a check screen for an updated guiding route displayed on a liquid crystal device 11 after the same operation as that in FIG. 8 when it is prohibited to turn right at a node N 3. FIG. 12 shows the updated guiding route 73.

When the guide starting button 75 is operated on the check screen, the operation determination section 33 determines that it is instructed to start guiding (step ST8), and the route guiding processing starts in the car navigation system.

If no request for generating an alternative route is made at the determination about the presence of the request for searching an alternative route (step ST14), the guiding route updating section 101 instructs the route guiding using the guiding route data 37 stored in the storage device 15 (step ST16). Then, the route guiding processing starts in the car navigation system.

If the fifth road 65 and the third road 63 are specified by a user as the road to be passed through as an arrow 81 in FIG. 8, the guiding route updating section 34 specifies the link L6, the link L7, the link L8 as the links of the road that is specified by the user for passage. In this embodiment, the guiding route updating section 34 simply specifies the road nearest to the position on the map that is specified by the user to pass through among the roads displayed on the liquid crystal device 11 as a road that is specified by the user to pass through. In other cases, for example, where searching conditions such as to prefer the freeway or to prefer the general road are specified when the guiding route generating section 31 generates the guiding route and there is a road matching better with the searching conditions within a predetermined range (for example, 1 km) from the road displayed nearest to the position operated by the user, the guiding route updating section 34 may specify the road matching better with the searching conditions as the road that is specified by the user for passage. The guiding route updating section 34 may specify the road matching best with the searching conditions in the predetermined range from the position on the map that is specified by the user as the road specified by the user for passage.

After a link of the road specified by the user for passage is identified, the guiding route updating section 34 as intersection specifying means determines whether the road that is specified by the user for passage and the guiding route generated by the guiding route generating section 31 are crossing at the two points or not, i.e., the presence and the number of crossing (step ST11). If passage specification is performed as shown in FIG. 8, the node N1 connected with the link L6 and the node N4 connected with the link L8 are included in the road specified by the user for passage and the guiding route generated by the guiding route generating section 31. The guiding route updating section 34 determines that the two places of the node N1 and the node N4 are crossing.

If it is determined that the two places are crossing, the guiding route updating section 34 verifies the section between the two intersections for the user-specified pass-through road. The guiding route updating section 34 performs necessary correction according to the result of the verification and generates the route available for a vehicle to pass through (step ST5).

Specifically, the guiding route updating section 34 first generates the route by sorting links of the identified specified pass-through roads in order from the intersection at the starting point side (here, N1) and the intersection at the ending point side (here, N4) in the guiding route data 37. If passage specification is performed as shown in FIG. 8, the guiding route updating section 34 generates the route "the node N1→the link L6→the node N5→the link L7→the node N6→the link L8→the node N4", for example. Hereinafter, that is called a user-specified route.

When the identified links are sorted and the user-specified route is generated, the guiding route updating section 34 passes the links and the nodes of the user-specified route in order and verifies whether it can be passed through from the staring point to the ending point of the user-specified route or not (step ST5). The guiding route updating section 34 performs verification by using the link data group 25, the node data group 26 and the jam/traffic regulation information 43. If there is a link or a node unavailable for passage, the guiding route updating section 34 replaces the link and the node available for passage for the link and the node unavailable for passage.

In the verification on the user-specified route, the guiding route updating section 34 first determines availability for traffic of the links from the starting point of the user-specified route one by one in order. If it is user-specified route of "the node N1→the link L6→the node N5→the link L7→the node N6→the link L8→the node N4", the guiding route updating section 34 determines whether the direction of the link L6, the first link, is in the direction from the node N1 to the node N5 or not. The link L6 is in the direction from the node N1 to the node N5. Accordingly, the guiding route updating section 34 determines that the direction of the link L6 is in the direction from the node N1 to the node N5 by referring to the link data group 36 and the like.

The link next to the link L6 in the user-specified route is the link L7. The link L7 is in the direction from the node N6 to the node N5. Accordingly, the guiding route updating section 34 determines that the direction of the link L7 is not in the direction from the node N5 to the node N6 by referring to the link data group 36 and the like. If it is determined that the link is not in the direction from the starting point to the ending point of the user-specified route, the guiding route updating section 34 starts replacement of the link.

In the replacement of the link, the guiding route updating section 34 first checks the presence of the link in the reverse direction in the same road as the link that is determined as unavailable for traffic. The link L7 has the link L9 in the reverse direction in the same road. Accordingly, the guiding route updating section 34 replaces the link L7 with the link L9. The user-specified route is "the node N1→the link L6→the node N5→the link L9→the node N6→the link L8→the node N4". When the link that is determined as unavailable for traffic has been replaced, the guiding route updating section 34 proceeds to the verification of the next link.

If there is no link in the reverse direction in the same road as the link that is determined as unavailable for traffic, the guiding route updating section 34 specifies the nodes at both ends of the link that is determined unavailable for traffic as the starting point and the ending point for searching, for example, and performs route searching. The guiding route updating section 34 replaces the link determined as unavailable for traffic with the route searched by the route searching.

The link next to the link L9 in the user-specified route is the link L8. The link L8 is in the direction from the node N6 to the node N4. Accordingly, the guiding route updating section 34 determines that the direction of the link L8 is in the direction from the node N6 to the node N4 by referring to the link data group 36 and the like.

The link L8 in the user-specified route is the last link. When all the links in the user-specified route have been verified, the guiding route updating section 34 determines availability for traffic of each node of the user-specified route.

If the user-specified route is "the node N1→the link L6→the node N5→the link L9→the node N6→the link L8→the node N4" when all the links in the user-specified route have been verified for availability for traffic, the guiding route updating section 34 determines availability for traffic for the nodes from the second node N5 to the second node from the bottom N6.

The two links of the link L6 and the link L9 connected with the node N5 are combined to enable straight-ahead driving at the intersection on the same road. The guiding route updating section 34 determines that it is available for traffic by referring to the node data group 26 and the like and checking that the straight-ahead driving is available there.

The two links of the link L9 and L8 connected with the node N6 are combined to make a road for turning to left at the intersection. When the guiding route updating section 34 checks that left turn is enabled at the node N6 by referring to the node data group 26 and the like, it determines that it is available for traffic.

When all the nodes of the user-specified route have been verified for availability for traffic, the guiding route updating section 34 finishes the verification of the user-specified route (step ST5).

If right turn is to be performed at the node but it is prohibited to turn right at the node in the verification for availability for traffic of the node, the guiding route updating section 34 specifies the node and the next node in the user-specified route as the starting point and the ending point for searching and performs route searching. The guiding route updating section 34 replaces the route searched by the route searching for the link between the node and the next node.

When the verification has been performed on the user-specified route (step ST5), the guiding route updating section 34 as updated guiding route generating means generates the updated guiding route by replacing the user-specified route available for traffic for the section between the two intersections that are previously specified in the guiding route data 37 (step ST6). If the user-specified route "the node N1→the link L6→the node N5→the link L9→the node N6→the link L8→the node N4" is generated based on the user-specified pass-through road in FIG. 8, the guiding route updating section 34 generates the updated guiding route "the link L1→the node N1→the link L6→the node N5→the link L9→the node N6→the link L8→the node N4→the link L5". The guiding route updating section 34 stores the updated guiding route in the storage device 15 as the updated guiding route data 38.

After storing the updated guiding route data 38 in the storage device 15, the guiding route updating section 34 as the determination means further verifies the final availability for traffic for the updated guiding route. Specifically, the guiding route updating section 34 determines whether it is available for traffic or not at the two connecting points of the user-specified route and the guiding route by the guiding route data 37 (step ST12).

In the updated guiding route generated based on the user-specified pass-through road in FIG. 8, the node N1 and the node N4 are the two connecting points. The guiding route updating section 34 determines whether right turn is prohibited from the link L1 to the link L6 at the node N1 or not and determines whether right turn is prohibited from the link L8 to the link L5 at the node N4 or not by referring to the node data group 26 and the like.

If the two connecting points are available for traffic, the guiding route updating section 34 instructs the guiding route checking section 32 to display the updated guiding route data 38 stored in the storage device 15. The guiding route checking section 32 causes the liquid crystal device 11 to display the updated guiding route with the map (step ST7).

FIG. 9B is a diagram showing an example of a check screen for a guiding route updated based on FIGS. 7, 8 and 11 displayed on the liquid crystal device 11 in FIG. 1. The guiding route displayed in FIG. 9B is a route from the current position to the destination 72 through the first road 61, the fifth road 65, the second toad 62 and the sixth road 66. The guiding route includes the fifth road 65 and the third road 63 that are the user-specified pass-through roads. Accordingly, the user can check the updated guiding route by specifying passage by himself/herself.

When the guide starting button 75 is operated on the check screen for a guiding route shown in FIG. 9B, the operation determination section 33 determines that it is instructed to start guiding. The guiding route updating section 34 specifies the updated guiding route data 38 to the route for guiding (step ST8).

If it is determined that one of the two connecting points, for example, is unavailable for traffic because of no right-turn in the determination of availability for traffic for the two connecting points in step ST12, the guiding route updating section 34 as warning means causes the liquid crystal device 11 to display a warning message indicting that the guiding route is unavailable for traffic (step ST13). Then, if it is determined that a request for generating an alternative route is issued based on the input on the touch panel 12 (step ST14), the guiding route updating section 34 as additional updating means searches an alternative route available for transportation and updates the updated guiding route (step ST15).

Specifically, for example, if the right turn is prohibited from the link L8 to the link L5 at the node N4, the guiding route updating section 34 specifies the node previous to the node N4 (here, the node N6) as the starting point and specifies the node next to the node N4 (here, the destination, as there is no node next to the node N4) as the ending point, for example, and performs route searching. Then, the guiding route updating section 34 replaces the route in the section of the updated guiding route with the searched route. Accordingly, the updated guiding route data 38 stored in the storage device 15 is updated to the route "the link L1→the node N1→the link L6→the node N5→the link L9→the node N6→the link L10→the node N7→the link L11→the node N8→the link L12".

When necessary updating processing has performed for the two connecting points of the updated guiding route (step ST15), the guiding route updating section 34 instructs the guiding route checking section 32 to display the updated guiding route data 38 updated that is stored in the storage device 15. The guiding route checking section 32 causes the liquid crystal device 11 to display the updated guiding route updated on the map (step ST7).

FIG. 9C is a diagram showing an example of a check screen for an updated guiding route updated that is displayed on the liquid crystal device 11 in FIG. 1. The guiding route displayed in FIG. 9C is a route from the current position to the destination through the first road 61, the fifth road 65, the fourth road 64 and the sixth road 66. The guiding route includes the fifth road 65 that is a user-specified pass-through road. Accordingly, the user can check the route available for traffic, which is a guiding route updated by the user specifying for passage.

When the guide starting button 75 is operated on the check screen for guiding a route shown in FIG. 9C, the operation determination section 33 determines that it is instructed to start guiding. The guiding route updating section 34 specifies the updated guiding route data, 38 updated as the route for guiding (step ST8).

If it is determined that a request for generating an alternative route is not issued in the determination at step ST11 after the warning display (step ST13), the guiding route updating section 34 as specifying means specifies the guiding route data 37 generated by the guiding route generating section 31 and stored in the storage device 15 as the route for guiding (step ST16).

Next, the case where it is determined that the user-specified pass-through road and the guiding route generated by the guiding route generating section 31 are not crossing at two places in the determination of the presence of the two intersections at step ST4, i.e., the cases of no crossing and only one crossing will be described.

FIG. 13 is a schematic diagram for illustrating how to operate the passage specification by a user for setting a road to be passed on a check screen for a guiding route shown in FIG. 7 in another way. Here, the user tracks a part of the fifth road 65 so as to cross the guiding route displayed on the liquid crystal device 11 in one place as shown as an arrow 111 in FIG. 13 (step ST2).

The touch panel 12 outputs the operation position information. The operation determination section 33 generates the position information on a map corresponding to the operated position (in FIG. 13, the position on which the arrow 111 is shown over) based on the operation position information from the touch panel 12 and the display data on the check screen for guiding a route and outputs it to the guiding route updating section 34.

If the part of the fifth road 65 is specified by the user as a road to be passed as an arrow 111 shows in FIG. 13, the guiding route updating section 34 specifies the link L6 as the links of the specified pass-through road, for example (step ST3). The guiding route updating section 34 determines that the user-specified pass-through road and the guiding route generated by the guiding route generating section 31 are crossing at only one place (in other words, they are not crossing at two places) at step ST4 (step ST11). The guiding route updating section 34 determines that they are not crossing at the two places (step ST11). If a user performs such passage specification as shown in FIG. 11, the specified pass-through road and the guiding route data 37 are crossing only at the node N1.

If it is determined that the specified pass-through road and the guiding route generated by the guiding route generating section 31 are crossing at a place (in other words, they are not crossing at two places) at step ST11, the guiding route updating section 34 as user-specified route generating section generates the user-specified route by extending the specified pass-through road to cross the guiding route generated by the guiding route generating section 31 at two points.

The guiding route updating section 34 first extracts a plurality of nodes in the periphery of the ends of the specified pass-through road that is determined as not crossing the guiding route (step ST17). If the specified pass-through road is "the node N1→the link L6→the node N5", the guiding route updating section 34 determines that the node N5 are not crossing the guiding route. Then, the guiding route updating section 34 extracts a node in the periphery of the node N5 from the nodes of the guiding route data 37. The guiding route updating section 34 extracts such as the node N2, the node N3, the node N4 and the like.

When a plurality of nodes in the periphery of the end of the specified pass-through road is extracted from the guiding route data 37, the guiding route updating section 34 searches a route between the node at the end of the specified pass-through road and each of the extracted nodes. The guiding route updating section 34 selects a route with a low cost from the searched out plurality of routes. The guiding route updating section 34 generates the user-specified route by connecting the selected route with the specified pass-through road (step ST18).

Accordingly, the guiding route updating section 34 generates a user-specified route such as "the node N1→the link L6→the node N5→the link L13→the node N3". The user-specified route is crossing the guiding route data 37 at two points between the node N1 and the node N3.

The processing of the guiding route updating section 34 after the user-specified route is generated (the processing after the step ST5) is the same as that based on the user-specified pass-through by the arrow 81 in FIG. 8, thus, it will be omitted from the description. Then, if right turn from the link L13 to the Link L4 is not prohibited at the node N3, the guiding route updating section 34 performs the processing at step ST7 and causes the liquid crystal device 11 to display the updated guiding route generated as shown in FIG. 14 with the map.

Figure 14:
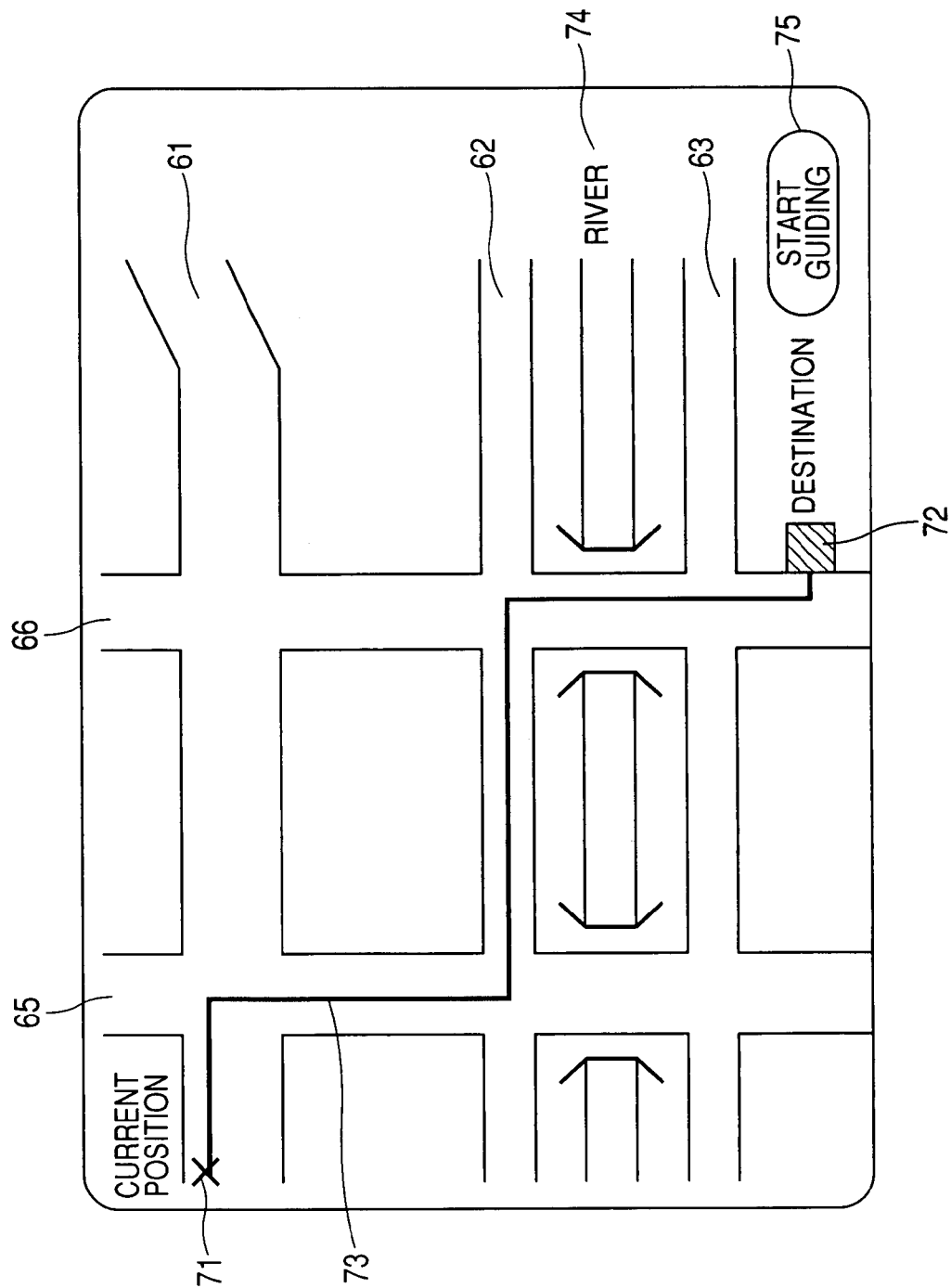
FIG. 14 is a diagram showing an example of a check screen for another updated guiding route displayed on a liquid crystal device in FIG. 15 after the operation of FIG. 13.

FIG. 14 is a diagram showing another example of a check screen for an updated guiding route displayed on the liquid crystal device in FIG. 1. The guiding route displayed in FIG. 12 is a route from the current position to the destination 72 through the first road 61, the fifth road 65, the second road 62 and the sixth road 66. The guiding route includes the fifth road 65 that is the user-specified pass-through road. Accordingly, the user can check the updated guiding route available for traffic by specifying passage by himself/herself.

When the guide starting button 75 is operated on the check screen for a guiding route shown in FIG. 14, the operation determination section 33 determines that it is instructed to start guiding. The guiding route updating section 34 specifies the updated guiding route data 38 stored in the storage device 15 to the route for guiding (step ST8).

If it is determined that the user-specified pass-through road and the guiding route generated by the guiding route generating section 31 are not crossing in determination on the presence of two intersections at step ST11, the guiding route updating section 34 generates a user-specified route that is crossing the guiding route generated by the guiding route generating section 31 at two points by extending both ends of the specified pass-through road specified by the user with the touch panel 12.

The guiding route updating section 34 first extracts a plurality of nodes in the periphery of both ends of the specified pass-through road that is determined as not crossing the guiding route from the guiding route (step ST17).

The guiding route updating section 34 searches for a route between a node at one end of the specified pass-through road and each extracted node in the periphery of that one end, selects a route with a low cost among the searched plurality of routes, connects the selected route to the specified pass-through road and generates the user-specified route (step ST18).

The guiding route updating section 34 searches for a route between a node at the other end of the specified pass-through road and each extracted node in the periphery of that the other end, selects a route with a low cost among the searched plurality of routes, connects the selected route with the specified pass-through road and generates the user-specified route (step ST18).

Accordingly, the guiding route updating section 34 generates the user-specified route that is crossing the guiding route generated by the guiding route generating section 31 at two points by extending both ends of the specified pass-through road by a user with the touch panel 12.

The processing of the guiding route updating section 34 after the user-specified route is generated (the processing after the step ST5) is the same as that based on the user-specified pass-through by the arrow 81 in FIG. 8, thus, it will be omitted from the description. The guiding route updating section 34 causes the liquid crystal device 11 to display the generated updated guiding route with the map. When the guide starting button 75 is operated on the check screen for a guiding route displayed on the liquid crystal device 11, the operation determination section 33 determines that it is instructed to start guiding. The guiding route updating section 34 specifies the updated guiding route data 38 stored in the storage device 15 to the route for guiding (step ST8).

If the guide starting button 75 is operated on the check screen for a guiding route as shown in FIGS. 7, 9B, 9C and 14, and the guiding route displayed at that moment is specified to the route for guiding as mentioned above, the car navigation system starts the route guiding processing for guiding a route so that a vehicle moves on the specified guiding route.

When the route guiding processing starts, the route guiding section 51 generates a map in the periphery of the current position of the vehicle with the map data 24 by using the position information output by the GPS receiver 13 as the current position information of the vehicle as shown in FIG. 4. The route guiding section 51 draws a mark indicating the current position of the vehicle and the guiding route in the map of the periphery on the generated map. The mark indicating the current position of the vehicle may be at a position according to the position information of the GPS receiver 13 or the position identified in map matching from that position. The route guiding section 51 outputs the display data on the display screen for the generated route guiding on the liquid crystal device 11. The liquid crystal device 11 displays the display screen for the route guiding.

When the position information of the GPS receiver 13 changes, the route guiding section 51 updates the display data on the display screen for the route guiding. The route guiding section 51 generates the display screen for route guiding, in which the changed position information is made as the current position of the vehicle. Accordingly, the map of the periphery of the current position of the vehicle, the current position of the vehicle in the map, and the guiding route are kept being displayed on the liquid crystal device 11.

Therefore, the user can reach the destination from the current position through a predetermined route that is specified by the user to pass through by driving the vehicle so that a mark 82 indicating the current position of the vehicle moves on the guiding route 84 on the map displayed in the liquid crystal device 11.

As mentioned above, the car navigation system according to the embodiment displays the roads in the periphery on the check screen for a guiding route generated based on the setting of the destination. The user can change it to the guiding route that passes through a desired road by operating to specify passage on the displayed road in the periphery. Further, the road specified by the user to pass through is verified for the availability for traffic and replaced with the other road available for traffic if required.

As a result, the user can be guided on a route from the current position or the like to the destination or the like through the roads that the user wants to pass by specifying the roads the user wants to pass on the check screen of the guiding route after the guiding route is generated.

In the embodiment in particular, if the user-specified pass-through road is not crossing the guiding route data 37 at two points (i.e., there is no or one crossing), the guiding route updating section 34 generates the user-specified route by extending the specified pass-through road to cross them by route searching. Furthermore, if the connecting point of the user-specified route and the guiding route data 37 is unavailable for traffic, the updated guiding route is further updated based on the user's instruction. Therefore, the user can be guided on a route available for traffic that passes through the road the user wants to pass as the user specifies only that road.

In the embodiment, if a connecting point of the updated guiding route is unavailable for traffic, the guiding route updating section 34 warns and lets the user select from further updating the updated guiding route or causing the guiding route generating section 31 to guide the generated guiding route. Therefore, even after the user-specified the road to pass through, the user can cancel it after the display of warning and can be guided on the guiding route generated by the guiding route generating section 31.

As mentioned above, the car navigation system according to the second embodiment can generate the guiding route up to the destination through the roads that the user wants to pass through. The guiding route is the route available for traffic even at the two intersections of the user-specified route and the route generate by the guiding route generating section 31. The car navigation system according to the second embodiment can guide on the guiding route.

Although the abovementioned embodiments are examples of preferable embodiments of the present invention, the present invention is not limited to the embodiments and various modifications and alterations are possible without departing from the spirit of the present invention.

For example, in the abovementioned embodiment, if the link in the direction from the starting point to the ending point of the guiding route is not stored in the link data group 25 as links of the user-specified pass-through road, the guiding route updating section 34 determines that the road is unavailable. Other than this, the guiding route updating section 34 may verify the route based on the user-specified pass-through road based on the traffic regulation information on a link and a node (for, example, no right turn at a certain node) stored in the link data group 25, the node data group 26 and jam/traffic regulation information 43, and determine that the section corresponding to the traffic regulation unavailable. In such a case, the guiding route updating section 34 may generate a route with both ends of the section determined as unavailable as the starting point and the ending point and make the generated route an alternative route.

In the abovementioned embodiment, the user specifies the route to pass through by performing the operation of passage specification as the user tracks a road displayed on the check screen of the guiding route generated based on the setting of the destination. Other than that, the route to pass through may be specified by a user moving a pointer or the like displayed in the display screen by using a cross key (not shown), for example. Yet other than that, the route to pass through may be specified by a user tracking the displayed road with a finger or moving the displayed pointer on the map screen displayed based on the map data.

In the abovementioned embodiment, the map including a road is displayed with the guiding route generated based on the setting of the destination for making the user to specify a point on the map to pass through. Other than that, the roads in the periphery may be displayed with the guiding route generated based on the setting of the destination for making the user to specify a desired road from the displayed road to pass through.

In the abovementioned embodiment, a case where the user-specified position for generating the guiding route is the destination is described. Other than that, as a position available for a user to specify, there are the departure, the place passed through and the point of passage.

In the second embodiment, if the user-specified route and the route generated by the guiding route generating section 31 are not crossing at two places, the guiding route updating section 101 extracts a plurality of nodes near the end (node) of the user-specified route that is not crossing among the routes generated by the guiding route generating section 31 and, among them, selects the node with the lowest cost from the end of the user-specified route as an intersection. Other than that, for example, the guiding route updating section 101 may select the node nearest to the end (node) of the user-specified route that is not crossing as an intersection. Alternatively, the guiding route updating section 101 may select a link instead of a node.

In the second embodiment, if it is determined that either of the two intersections of the user-specified route and the route generated by the guiding route generating section 31 is unavailable for traffic, the guiding route updating section 101 searches for a route from a node prior to the intersection unavailable for traffic to the node of the intersection unavailable for traffic, and updates the updated guiding route data 102 with the searched route. Other than that, for example, the guiding route updating section 101 may search for a route from the intersection unavailable for traffic to the node after the intersection and update the updated guiding route data 102 with the searched route, or search a route from a node prior to the intersection unavailable for traffic to the node after the intersection unavailable for traffic and update the updated guiding route data 102 with the searched route.

Other than that, for example, the guiding route updating section 101 may perform a plurality of searching pattern to update the updated guiding route data 102 in the route with the lowest cost among the patterns.

Other than that, for example, the guiding route updating section 101 may search for a route by using a node that is shifted by two before or after and update the updated guiding route data 102 with the searched route or update the updated guiding route data 102 with the route with the lowest cost among a plurality of searched result including a searched result with the node shifted by two before or after.

Yet other than that, for example, the guiding route updating section 101 may search for a route by shifting a node at the other route side before or after by prioritizing either the user-specified route or the route generated by the guiding route generating section 31, and update the updated guiding route data 102 by using the searched result.

In the abovementioned embodiment, the guiding route updating section 34 specifies nodes before and after the connecting point to a starting point and an ending point of route searching in searching processing of an alternative route when it is unavailable for traffic at a connecting point between the user-specified route and a guiding route.

In the abovementioned embodiment, the guiding route updating section 34 may specify the node at a distance by two places before or after the connecting point as the starting point or the ending point, specify the connecting point, the node prior to the connecting point or the node at two placed before the connecting point, or specify the connecting point, the node immediately after the connecting point or the node after the connecting point by two places. The guiding route updating section 34 may specify the node shifted from the connecting point only for the other route side and specify the connecting point and the node as the starting point and the ending point for the route searching so that either the user-specified route or the route generated by the guiding route generating section 31. The guiding route updated section 34 may specify a plurality of sets of the starting points and the ending points, select a route with the lowest cost among the searching result of each set, and update the updated guiding route by using the selected route.

In the case where a route between the node before and after the node at the connecting point is searched for a connecting point unavailable for traffic and the updated guiding route is updated with the searched route as in the embodiment, the updated guiding route updated becomes such a route with a big detour outside, making the route more difficult than in the case where a route between the connecting point unavailable for traffic and the node immediately after or in the case where a route between the connecting point unavailable for traffic with the route immediately before. If the updated guiding route updated becomes a route with a big detour outside, the user feels the route unsuitable.

Figure 15:
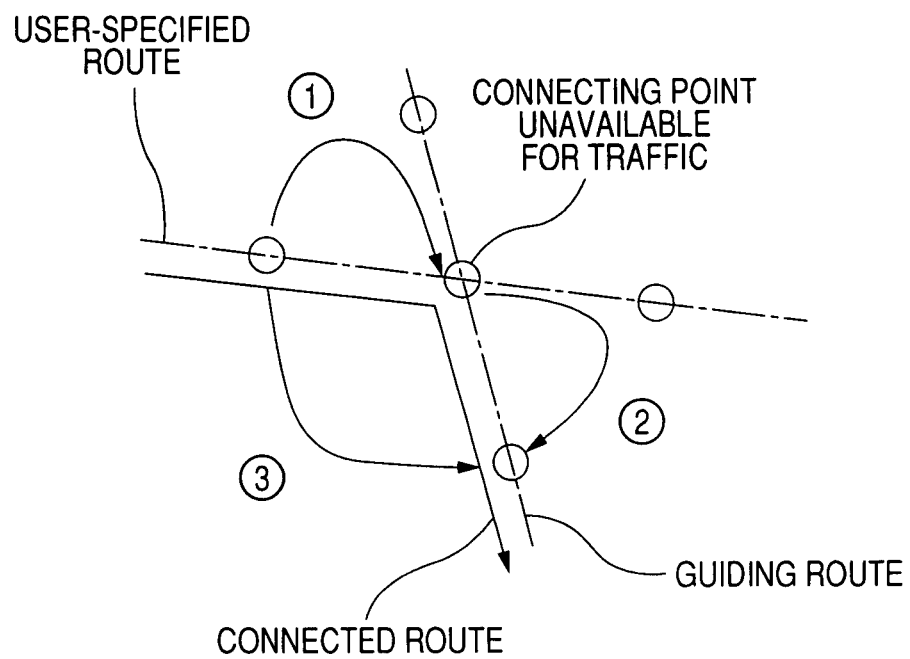
FIG. 15 is a schematic diagram showing a crossing state of the user-specified route and the guiding route.

That is, as shown in FIG. 15, the user-specified route and the guiding route are crossing. FIG. 15 is a schematic diagram showing a crossing state of the user-specified route and the guiding route. In FIG. 15, an alternate long and short dash line denotes the user-specified route, an alternate long and two short dashes line denotes the guiding route, and a round denotes a node.

If the node in the center of FIG. 15 is a connecting point unavailable for traffic and only a node of either the user-specified route or the guiding route is shifted to search for a route with the node of the connecting point unavailable for traffic, the routes in the periphery of the connecting point unavailable for traffic is highly possible to be searched for a route that largely detours outside the route as shown by the number one in a circle or the number two in a circle. In contrast, when both nodes of the user-specified route or the guiding route are shifted and if the route becomes a route largely detours the abovementioned route as shown by the number three in a circle in FIG. 15, the route is highly possible to become a route that detouring inside the route. As a result, the updated guiding route may be updated so as not to make the user feel the route unsuitable.

INDUSTRIAL APPLICABILITY

The present invention can be applied to the car navigation system.

The invention claimed is:

1. A guiding route generating device comprising:
storage means for storing a route generated based on specification of a position as a guiding route to be used for route guidance;
display means for displaying on a screen the guiding route stored in the storage means with roads in the periphery of the guiding route;
specified road specifying means for specifying a predetermined road among the roads displayed with the guiding routes as a specified pass-through road based on a user's operation tracing the surface of the screen by the user's finger;
intersection specifying means for specifying the presence and the number of intersections of the specified pass-through road and the guiding route stored in the storage means;
user-specified route generating means for generating two routes between the specified pass-through road and the guiding route and generating a user-specified route which is the specified pass-through road extended with the generated two routes, when the intersection specifying means specifies that there is no intersection, and generating a route between the specified pass-through road and the guiding route and generating a user-specified route which is the specified pass-through road extended with the generated route, when the intersection specifying means specifies only one of the intersections;
updated guiding route generating means for generating an updated guiding route by connecting the user-specified route with the guiding route stored in the storage means at their intersections.

2. The guiding route generating device according to claim 1, further comprising:
regulation information storage means for storing traffic regulation information relating to the road;
determining means for determining whether traffic is available for said updated guiding route generated by said updated guiding route generating means at a connecting point where said user-specified route and said guiding route stored in said storage means are connected based on information stored in said regulation information storage means; and
warning means for outputting warning when the determining means determines that traffic is unavailable at the connecting point.

3. The guiding route generating device according to claim 2, further comprising:
specifying means for specifying said guiding route stored in said storage means to a given route for guidance after warning is made by said warning means.

4. The guiding route generating device according to claim 1, further comprising:
regulation information storage means for storing traffic regulation information relating to the road;
determining means for determining whether traffic is available for said updated guiding route generated by said updated guiding route generating means at a connecting point where said user-specified route and said guiding route stored in said storage means are connected based on information stored in said regulation information storage means; and
additional updating means for updating said updated guiding route generated by said updated guiding route generating means when the determining means determines that traffic is unavailable at the connecting point.

5. The guiding route generating device according to claim 1, wherein
said specified road specifying means specifies a road which is displayed nearest to a user operating place or a road which is within a predetermined range from the user's operating place or a place nearest to the user operating place and matches better with searching conditions specified in generating the guiding route as the specified pass-through road.

6. The guiding route generating device according to claim 1, wherein
said user-specified route generating means generates a route between said specified pass-through road and said guiding route by searching routes between an end of said specified pass-through route not crossing said guiding route and a branch point of a road on said guiding route near the end.

7. The guiding route generating device according to claim 4, wherein
said additional updating means updates said updated guiding route by searching for a route between branch points of the road before and after the connecting point that is determined as unavailable for traffic on said updated guiding route and replacing the searched route for the route between the branch point of the road before and the branch point of the road after.

8. A guiding route generating method comprising the steps of:
displaying on a screen a guiding route generated based on specification of a position and stored in a storage means with roads in the periphery of the guiding route;
specifying a predetermined road among the roads displayed with the guiding route as a specified pass-through road based on a user operation tracing the surface of the screen by the user's finger;

specifying the presence and the number of intersections of the specified pass-through road and the guiding route stored in the storage means;

generating two routes between the specified pass-through road and the guiding route and generating a user-specified route which is the specified pass-through road extended with the generated two routes, when it is determined as no intersection is present and generating a route between the specified pass-through road and the guiding route and generating a user-specified route which is the specified pass-through road extended with the generated route, when only one of the intersections is identified; and generating updated guiding route by connecting the user-specified route with the guiding route stored in the storage means at their intersections.

9. A guiding route generating device comprising:

storage means for storing route generated based on specification of a position as a guiding route to be used for route guidance;

display means for displaying the guiding route stored in the storage means with roads in the periphery of the guiding route;

user-specified route generating means for generating a user-specified route which is available as a part of the route from a starting point to an ending point of the guiding route based on passage specification by a user for the road displayed with the guiding route; and intersection determining means for determining whether a route which connects the user-specified route generated by the user-specified route generating means with the guiding route stored in the storage means is regulated for traffic in the direction from a starting point to an ending point of the route that connects the routes at intersections between the user-specified route and the guiding route or not.

10. The guiding route generating device according to claim 9, further comprising regulation information storage means for storing traffic regulation information relating to the road, wherein the intersection determining means determines that a route is unavailable for traffic if the regulation information storage means stores information for regulating traffic in the direction from the starting point to the ending point of the guiding route for two intersections of the routes.

11. The guiding route generating device according to claim 10, wherein the traffic regulation information relating to the road stored in the regulation information storage means is set up to a node indicating branch points of the road or a link indicating the road between nodes, and wherein the intersection determining means determines that a route is unavailable for traffic if there is information for regulating traffic in the direction from the starting point to the ending point of the guiding route, the information being associated with the node or the link for two intersections of the routes.

12. The guiding route generating device according to any one of claims 9-11, further comprising:

generating means for generating an alternative route for a place unavailable if the intersection determining means determines that the specified pass-through road is unavailable for traffic, updating means for updating a part or the entire of the guiding route stored in the storage means with the route which combines the road determined as available by the intersection determining means and the road for the alternative route generated by the generating means, second generating means for generating an alternative route which passes over or near the intersections that are determined as unavailable for traffic and both ends of which are connected to the route updated by the updating means if the intersection determining means determines that the route is unavailable for traffic, and additional updating means for updating a part of the guiding route updated by the updating means with the alternative route generated by the second generating means.

13. The guiding route generating device according to claim 12, further comprising:

second storage means for storing the road determined as unavailable for traffic by the intersection determining means, wherein the display means displays the road stored in the second storage means with the guiding route that is updated by the updating means and stored in the storage means.

14. The guiding route generating device according to any one of claims 9-11 and 13, wherein the intersection determining means extracts a plurality of nodes near a node of the user-specified route that is not crossing among guiding routes and selects the node with the lowest cost from the node of the user-specified route as the intersection or selects the node nearest to the node of the user-specified route that is not crossing among the guiding routes as the intersection if the user-specified route generated by the user-specified route generating means and the guiding route stored in the storage means do not intersect at two points.

15. A guiding route generating method performed by a guiding route generating device comprising storage means for storing a route generated based on specification of a position as a guiding route to be used for route guidance, display means, user-specified route generating means, and intersection determining means, the method comprising the steps of:

displaying the guiding route stored in the storage means with roads in the periphery of the guiding route by the display means;

generating a user-specified route which is available as a part of the route from a starting point to an ending point of the guiding route based on passage specification by a user for the road displayed with the guiding route by the user-specified route generating means; and determining whether a route which connects the user-specified route generated by the user-specified route generating means with the guiding route stored in the storage means is regulated for traffic in the direction from a starting point to an ending point of the route that connects the routes at intersections between the user-specified route and the guiding route or not by the intersection determining means.

16. The guiding route generating method according to claim 15, wherein the guiding route generating device further comprises regulation information storage means for storing traffic regulation information relating to the road, and wherein the intersection determining means determines that a route is unavailable for traffic if the regulation information storage means stores information for regulating traffic in the direction from the starting point to the ending point of the guiding route for two intersections of the routes in the determining step.

17. The guiding route generating method according to claim 16,
wherein the traffic regulation information relating to the road stored in the regulation information storage means is set up to a node indicating branch points of the road or a link indicating the road between nodes, and
wherein the intersection determining means determines that a route is unavailable for traffic if there is information for regulating traffic in the direction from the starting point to the ending point of the guiding route in the determining step, the information being associated with the node or the link for two intersections of the routes.

18. The guiding route generating method according to any one of claims 15-17,
wherein the guiding route generating device further comprises generating means, second generating means, updating means, and additional updating means,
the method further comprising the steps of:
generating an alternative route for a place unavailable by the generating means if the intersection determining means determines that the specified pass-through road is unavailable for traffic;
updating a part or the entire of the guiding route stored in the storage means with the route which combines the road determined as available by the intersection determining means and the road for the alternative route generated by the generating means by the updating means;
generating an alternative route which passes over or near the intersections that are determined as unavailable for traffic and both ends of which are connected to the route updated by the updating means by the second generating means if the intersection determining means determines that the route is unavailable for traffic; and
updating a part of the guiding route updated by the updating means with the alternative route generated by the second generating means by the additional updating means.

19. The guiding route generating method according to claim 18,
wherein the guiding route generating device further comprises second storage means for storing the road determined as unavailable for traffic by the intersection determining means,
the method further comprising a step of:
displaying the road stored in the second storage means with the guiding route that is updated by the updating means and stored in the storage means by the display means.

20. The guiding route generating method according to any one of claims 15-17 and 19,
wherein the intersection determining means extracts a plurality of nodes near a node of the user-specified route that is not crossing among guiding routes and selects the node with the lowest cost from the node of the user-specified route as the intersection or selects the node nearest to the node of the user-specified route that is not crossing among the guiding routes as the intersection in the determining step if the user-specified route generated by the user-specified route generating means and the guiding route stored in the storage means do not intersect at two points.

* * * * *